US012227028B2

(12) United States Patent
Kouno et al.

(10) Patent No.: US 12,227,028 B2
(45) Date of Patent: Feb. 18, 2025

(54) WHEEL WITH MULTIPLE RESILIENT TIRES

(71) Applicant: BRIDGESTONE CORPORATION, Tokyo (JP)

(72) Inventors: Yoshihide Kouno, Tokyo (JP); Seiji Kon, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 432 days.

(21) Appl. No.: 17/755,048

(22) PCT Filed: Oct. 16, 2020

(86) PCT No.: PCT/JP2020/039152
§ 371 (c)(1),
(2) Date: Apr. 20, 2022

(87) PCT Pub. No.: WO2021/079834
PCT Pub. Date: Apr. 29, 2021

(65) Prior Publication Data
US 2022/0379657 A1 Dec. 1, 2022

(30) Foreign Application Priority Data

Oct. 21, 2019 (JP) .................................. 2019-192025
Oct. 21, 2019 (JP) .................................. 2019-192026

(51) Int. Cl.
*B60B 9/06* (2006.01)
*B60B 11/04* (2006.01)
*B60C 7/18* (2006.01)

(52) U.S. Cl.
CPC ................ *B60B 9/06* (2013.01); *B60B 11/04* (2013.01); *B60C 7/18* (2013.01); *B60B 2900/351* (2013.01); *B60B 2900/711* (2013.01)

(58) Field of Classification Search
CPC .. B60B 9/02; B60B 9/06; B60B 11/06; B60B 11/04; B60C 7/18; B60C 7/24; B60C 7/16

See application file for complete search history.

(56) References Cited

U.S. PATENT DOCUMENTS

| 850,265 A | 4/1907 | Sower |
| 1,039,427 A | 9/1912 | McCarty |

(Continued)

FOREIGN PATENT DOCUMENTS

| CN | 102267237 A | 12/2011 |
| CN | 102433010 A | 5/2012 |

(Continued)

OTHER PUBLICATIONS

Oct. 28, 2022, search result of the Extended European Search Report issued by the European Patent Office in the corresponding European Patent Application No. 20878249.0.

(Continued)

*Primary Examiner* — Jason R Bellinger
(74) *Attorney, Agent, or Firm* — KENJA IP LAW PC

(57) ABSTRACT

A vehicle wheel includes two annular rim members, at least one annular flange member disposed between the two rim members, a securing member that secures relative positional relationship between adjacent members among the two rim members and the at least one flange member, a plurality of body springs that each connects adjacent members among the two rim members and the at least one flange member, and a plurality of linking springs linked to the plurality of body springs so as to restrict relative displacement between the plurality of body springs. At least part of each body spring in a width direction of the vehicle wheel protrudes further to an outer side in a radial direction of the vehicle wheel than the rim members and the flange member, and the (Continued)

plurality of body springs is provided at intervals over an entire circumferential direction of the vehicle wheel.

11 Claims, 18 Drawing Sheets

(56) References Cited

U.S. PATENT DOCUMENTS

| | | | | |
|---|---|---|---|---|
| 1,080,385 | A * | 12/1913 | Stillman | B60B 11/06 152/398 |
| 1,174,350 | A * | 3/1916 | Remington et al. | B60B 11/06 152/406 |
| 1,180,671 | A | 4/1916 | Powers | |
| 1,217,461 | A | 2/1917 | Kemmerich | |
| 1,662,208 | A * | 3/1928 | Pounds | B60B 11/06 301/38.1 |
| 3,096,123 | A * | 7/1963 | Thompsett | B60B 23/10 301/36.1 |
| 3,155,429 | A * | 11/1964 | Metzler | B60B 11/10 301/40.3 |
| 5,788,335 | A * | 8/1998 | O'Brien | B60B 15/26 301/41.1 |
| 7,331,637 | B2 | 2/2008 | Hill | |
| 8,141,606 | B2 | 3/2012 | Benzing, II et al. | |
| 8,662,122 | B2 | 3/2014 | Benzing, II | |
| 8,720,504 | B2 | 5/2014 | Benzing, II et al. | |
| 8,931,531 | B2 | 1/2015 | Kubeck et al. | |
| 9,616,713 | B2 | 4/2017 | Lettieri et al. | |
| 9,744,804 | B2 * | 8/2017 | Pope | B60B 11/06 |
| 10,427,461 | B1 * | 10/2019 | Padula, II | B60C 7/06 |
| 11,845,309 | B2 * | 12/2023 | Kouno | B60C 7/06 |
| 2007/0108835 | A1 | 5/2007 | Hill | |
| 2011/0277893 | A1 | 11/2011 | Benzing, II | |
| 2012/0223497 | A1 | 9/2012 | Radziszewski et al. | |
| 2022/0227174 | A1 * | 7/2022 | Kouno | B60C 7/24 |

FOREIGN PATENT DOCUMENTS

| | | | |
|---|---|---|---|
| CN | 102448737 | A | 5/2012 |
| CN | 102825978 | A | 12/2012 |
| CN | 103419567 | A | 12/2013 |
| CN | 109291737 | A | 2/2019 |
| CN | 109291737 | B | 11/2020 |
| GB | 198767 | A | 6/1923 |
| GB | 257457 | A | 9/1926 |
| JP | S5240401 | U | 3/1977 |
| JP | 2008162495 | A | 7/2008 |
| JP | 2009515754 | A | 4/2009 |
| WO | 2010138150 | A2 | 12/2010 |

OTHER PUBLICATIONS

Apr. 26, 2022, International Preliminary Report on Patentability issued in the International Patent Application No. PCT/JP2020/039152.

Dec. 28, 2020, International Search Report issued in the International Patent Application No. PCT/JP2020/039152.

Mar. 9, 2024, search result of Office Action issued by the China National Intellectual Property Administration in the corresponding Chinese Patent Application No. 202080073646.6.

* cited by examiner

WHEEL WITH MULTIPLE RESILIENT TIRES

BACKGROUND

Technical Field

The present disclosure relates to a vehicle wheel.

Tires that are configured with coil springs are known. For example, in Patent Literature (PTL) 1, a tire is described that includes a plurality of coil springs, wherein each coil spring is interlaced with another coil spring and secured to an annular rim to thereby form a toroidal shape as a whole.

CITATION LIST

Patent Literature

PTL 1: WO 2010/138150

SUMMARY

Technical Problem

As described in PTL 1, however, a vehicle wheel with only one toroidal-shaped tire may sometimes not be able to support its load when the load on the vehicle wheel increases. In particular, in a case in which a tire is configured with coil springs as in the tire described in PTL 1, when force greater than or equal to a certain level is applied to the coil springs, it may fail to perform its function as a tire, for example due to buckling of the coil springs.

It would be helpful to provide a vehicle wheel that includes a tire configured with springs and that is capable of supporting a large load.

Solution to Problem

A vehicle wheel according to the present disclosure includes: two annular rim members disposed on a same axis;
at least one annular flange member disposed between the two rim members so as to have a same rotation axis as the two rim members;
a securing member that secures a relative positional relationship between adjacent members among the two rim members and the at least one flange member;
a plurality of body springs that each connect adjacent members among the two rim members and the at least one flange member; and
a plurality of linking springs that are linked to the plurality of body springs so as to restrict relative displacement between the plurality of body springs, wherein
at least part of each body spring in the plurality of body springs in a width direction of the vehicle wheel protrudes further to an outer side in a radial direction of the vehicle wheel than the rim members and the flange member, and the plurality of body springs are provided at intervals over an entire circumferential direction of the vehicle wheel.

Advantageous Effect

According to the present disclosure, a vehicle wheel that includes a tire configured with springs and that is capable of supporting a large load can be provided.

DETAILED DESCRIPTION

Hereinafter, the present disclosure will be described by illustration with reference to the drawings.

Figure 1:
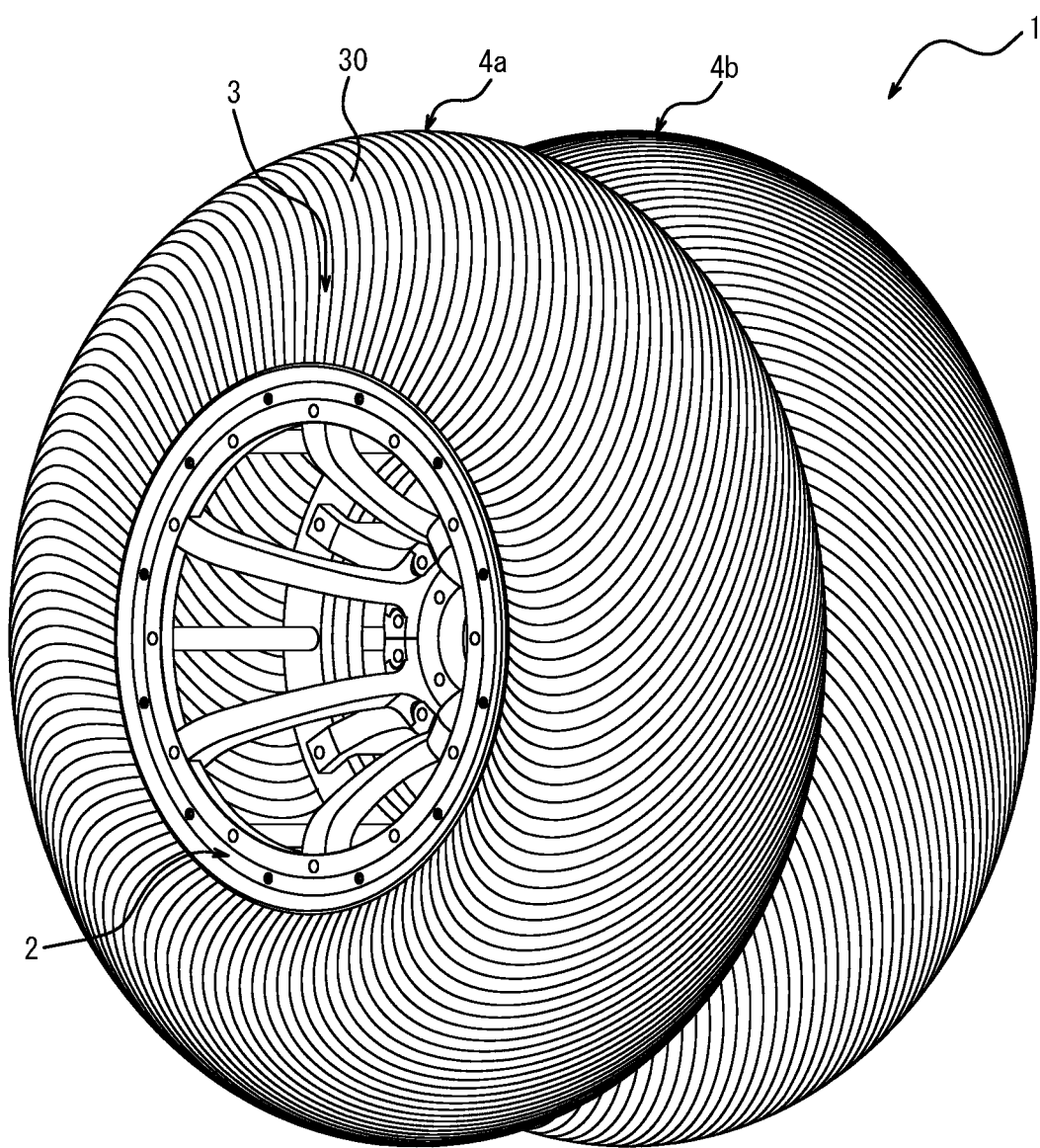
FIG. 1 is an external perspective view illustrating a vehicle wheel according to an embodiment of the present disclosure.

FIG. 1 is an external perspective view illustrating a vehicle wheel 1 according to an embodiment of the present disclosure. The vehicle wheel 1 is configured by a skeleton portion 2 and a tread portion 3. Specifically, as illustrated in FIG. 1, the vehicle wheel 1 is configured to have its outer side in a radial direction covered with the tread portion 3, which is mounted to the outer side in the radial direction of the skeleton portion 2. The radial direction of the vehicle wheel 1 is a direction perpendicular to a rotation axis of the vehicle wheel 1.

The vehicle wheel 1 according to the present embodiment includes two tire portions 4a, 4b. In the present embodiment, the tire portions 4a, 4b are each configured by part of the skeleton portion 2 that is obtained by dividing the skeleton portion 2 into two halves in a width direction of the vehicle wheel 1, and part of the tread portion 3 attached to the part of the skeleton portion 2. Each of the tire portions 4a, 4b is a portion with an outline that is convex toward the outer side in the radial direction of the vehicle wheel 1 in the sectional view in the width direction of the vehicle wheel 1. The width direction of the vehicle wheel 1 refers to a direction parallel to the rotation axis of the vehicle wheel 1.

Figure 2:
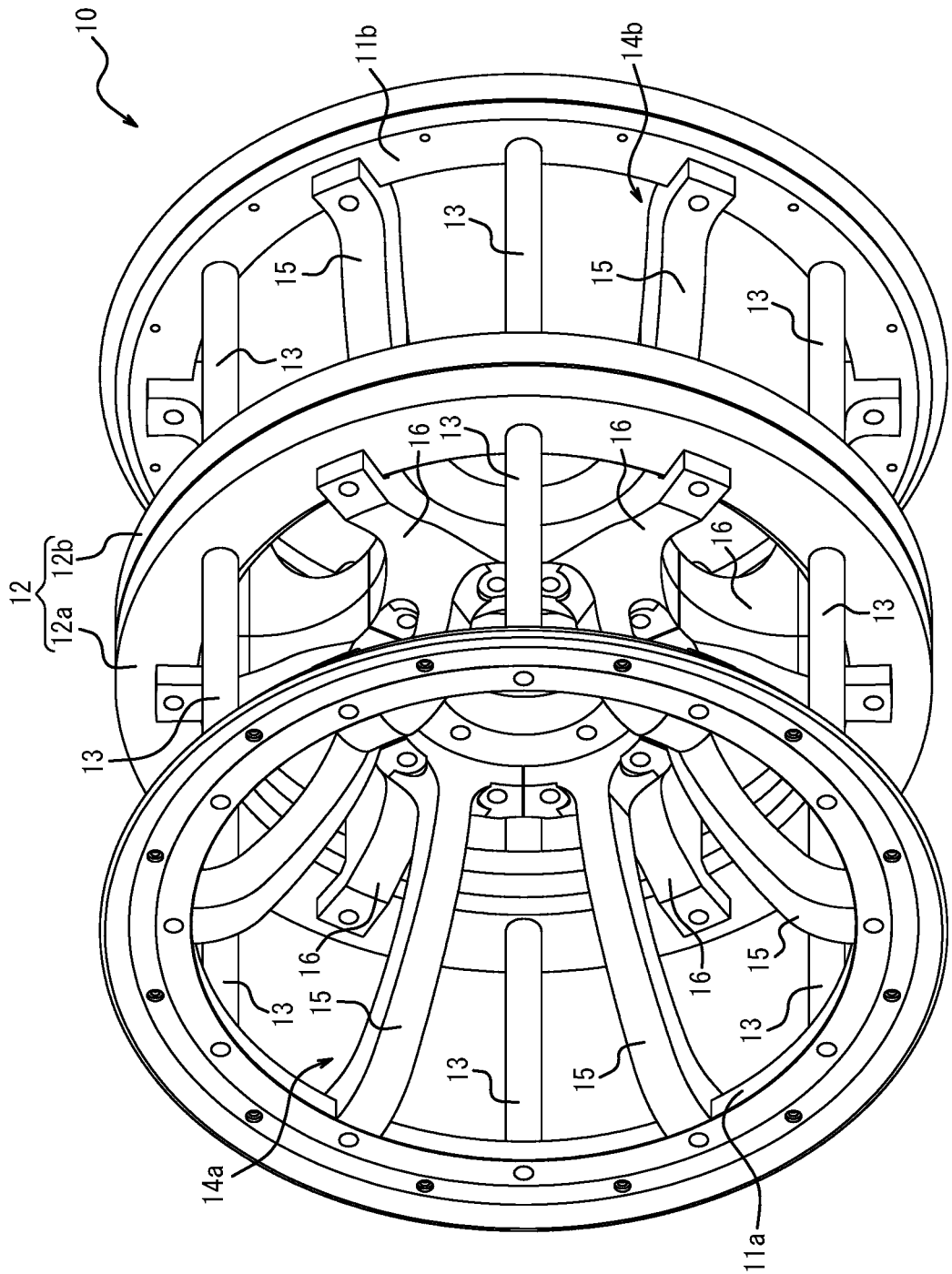
FIG. 2 is an external perspective view illustrating a wheel portion of a skeleton portion of the vehicle wheel of FIG. 1.

The skeleton portion 2 is configured by a wheel portion and a deformable ground contacting portion that can deform due to contact with a ground surface. FIG. 2 is an external perspective view illustrating the wheel portion 10 of the skeleton portion 2 of the vehicle wheel 1 of FIG. 1. Components of the wheel portion 10 are made of metal or resin. As illustrated in FIG. 2, in the present embodiment, the wheel portion 10 includes two rim members 11a, 11b and one flange member 12. The rim members 11a, 11b and the flange member 12 are all formed in annular shapes with the same outer diameter. The rim members 11a, 11b and the flange member 12 are all disposed so as to have the same rotation axis. Specifically, the rotation axis of the rim members 11a, 11b and the flange member 12 coincides with the rotation axis of the vehicle wheel 1. The flange member 12 is disposed between the two rim members 11a, 11b. The outer diameter of the rim members 11a, 11b and the flange member 12 is determined as appropriate in accordance with the size of the vehicle wheel 1 required.

The rim member 11a and the flange member 12 are secured by a plurality of securing members 13. The rim member 11b and the flange member 12 are also secured by a plurality of securing members 13. In the example of FIG. 2, the rim member 11a and the flange member 12 are secured by six securing members 13, and the rim member 11b and flange member 12 are secured by six securing members 13. In the present embodiment, the securing members 13 are bar-shaped members and are disposed to extend in the width direction of the vehicle wheel 1. The securing members 13 secure the relative positional relationship between adjacent members (herein, the rim member 11a and flange member 12, and the flange member 12 and the rim member 11b) among the rim members 11a, 11b and the flange member 12. Consequently, the relative positional relationship between all of the rim members 11a, 11b and the flange member 12 is secured.

Spoke members 14a, 14b are respectively attached to the rim members 11a, 11b. The spoke members 14a, 14b in the present embodiment each have six spokes 15 as illustrated in FIG. 2. These six spokes 15 are secured to the rim members 11a, 11b, whereby the spoke members 14a, 14b are respectively attached to the rim members 11a, 11b. Because the skeleton portion 2 includes the spoke members 14a, 14b, strength of the vehicle wheel 1 can be increased.

As illustrated in FIG. 2, in the present embodiment, the spoke members 14a, 14b each further include six sub-spokes 16. The six sub-spokes 16 are secured to the flange member 12, whereby the spoke members 14a, 14b are also attached to the flange member 12. Additionally, the spoke members 14a, 14b do not necessarily need to include a sub-spoke 16. In the present embodiment, the spoke members 14a, 14b further include an annular portion at which the spokes 15 and the sub-spokes 16 are linked.

Figure 3:
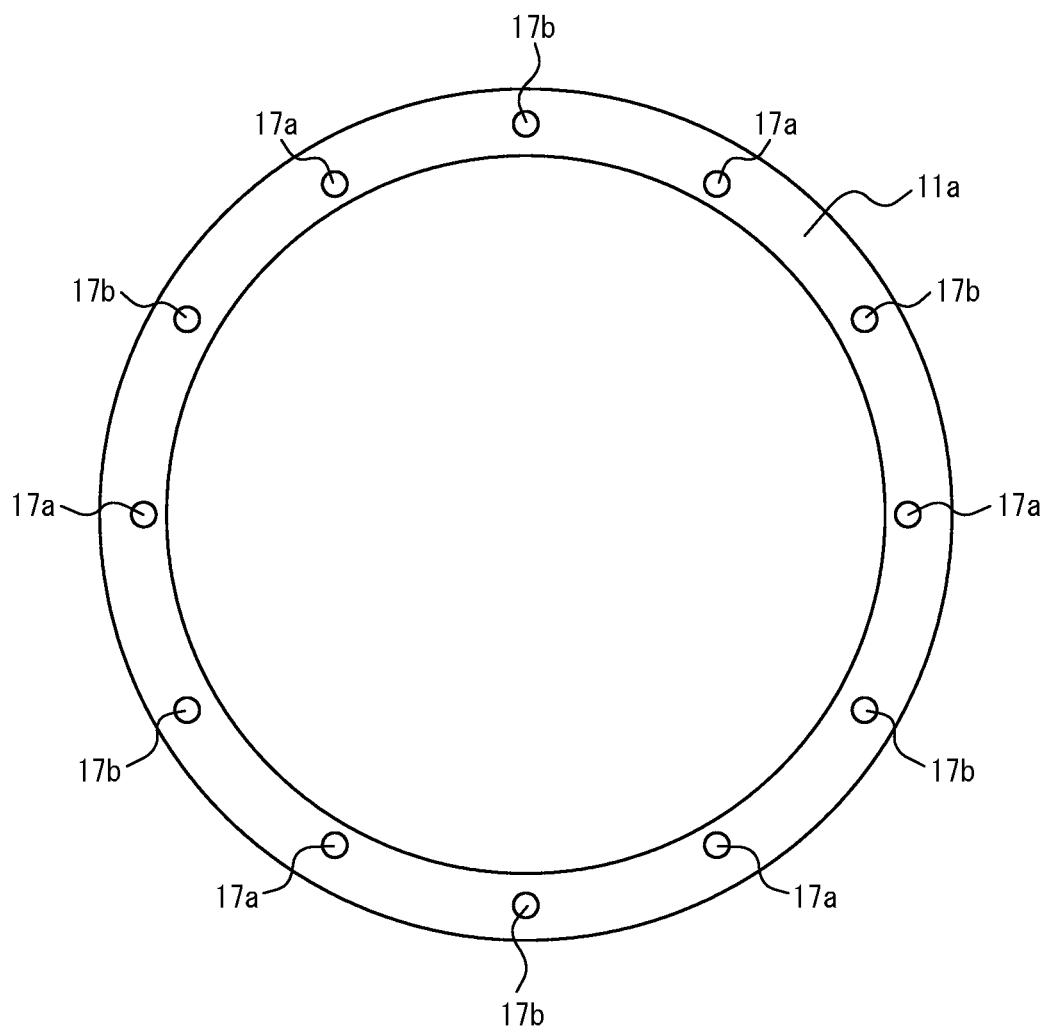
FIG. 3 is a schematic view illustrating positions of bolt holes in a rim member of the wheel portion of FIG. 2.

The rim members 11a, 11b are provided with bolt holes used to secure the securing members 13 and the spokes 15. FIG. 3 is a schematic view illustrating positions of the bolt holes provided in the rim member 11a. This is a schematic view of the rim member 11a as viewed from the width direction of the vehicle wheel 1. In FIG. 3, however, part of the rim members 11a, 11b that is located on the outer side in the radial direction is omitted.

As illustrated in FIG. 3, the rim member 11a is provided with six first bolt holes 17a for the six securing members 13. The first bolt holes 17a are provided in correspondence with positions of the securing members 13 included in the spoke member 14a. In the present embodiment, the first bolt holes 17a are provided at regular intervals along a circumferential direction of the rim member 11a. In the present embodiment, because the rim member 11a has the six first bolt holes 17a, the first bolt holes 17a are provided every 60 degrees around the central axis (rotation axis of the vehicle wheel 1). The securing members 13 are secured to the rim member 11a at the first bolt holes 17a using bolts.

The rim member 11a is also provided with second bolt holes 17b for the six spokes 15. The second bolt holes 17b are provided in correspondence with positions of the spokes 15 included in the spoke member 14a. In the present embodiment, the second bolt holes 17b are provided at regular intervals along the circumferential direction of the rim member 11a. In the present embodiment, each second bolt hole 17b is provided in the middle of two first bolt holes 17a. The spokes 15 are secured to the rim member 11a at the second bolt holes 17b using bolts, whereby the spoke member 14a is secured to the rim member 11a.

The rim member 11b may also include first bolt holes 17a and second bolt holes 17b provided at the same positions as those in the rim member 11a described with reference to FIG. 3. The flange member 12 may also include first bolt holes 17a and second bolt holes 17b, as is the case with the rim member 11a described with reference to FIG. 3. The securing members 13 and the spoke members 14a, 14b may be secured at the first bolt holes 17a and the second bolt holes 17b using bolts. The second bolt holes 17b provided in the flange member 12 are used to secure the sub-spokes 16 of the spoke members 14a, 14b using bolts. In a case in which the spoke members 14a, 14b do not have a sub-spoke 16, the flange member 12 does not need to include a second bolt hole 17b.

In the present embodiment, the flange member 12 is formed by connecting two members. Specifically, the flange member 12 is formed by connecting a first member 12a and a second member 12b. The first member 12a and the second member 12b are members having the same shape, and it is configured by securing these members facing in opposite directions, i.e., back-to-back. In a case in which the flange member 12 is configured by two members, when the vehicle wheel 1 is assembled, the tire portions 4a, 4b can be formed before the two members are connected so as to configure the flange member 12. This makes the operation easy.

Additionally, the flange member 12 may be formed by an integral member. In a case in which the flange member 12 is formed by an integral member, it is not necessary to assemble the flange member 12 when assembling the vehicle wheel 1. Operation steps can therefore be reduced.

Figure 4:
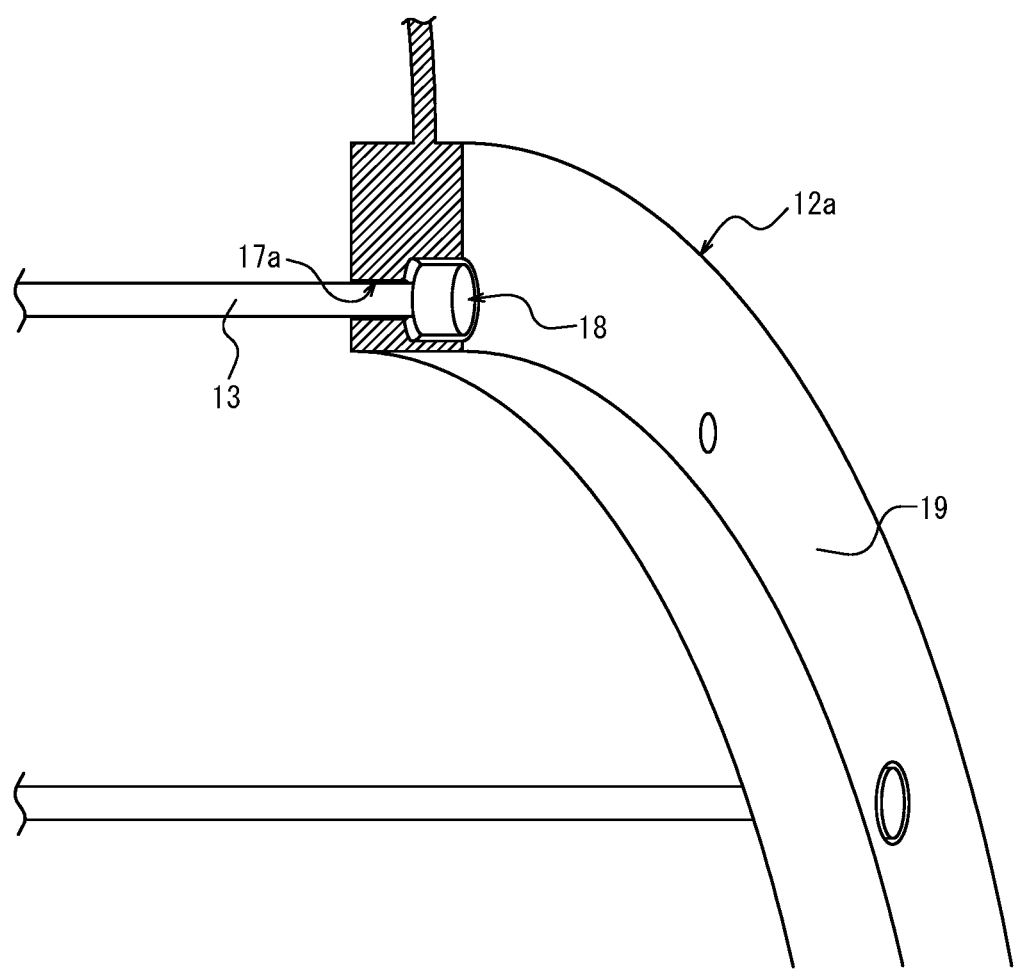
FIG. 4 is a schematic view illustrating counter boring in a first member of FIG. 2.

In a case in which the flange member 12 is formed by two members, as in the present embodiment, counter bores 18 may be provided in the first bolt holes 17a for the securing members 13 that are provided in the first member 12a and the second member 12b. Specifically, as schematically illustrated for the first member 12a in FIG. 4, counter bores 18 may be formed on a surface 19 of the first member 12a that comes into contact with the second member 12b when the first member 12a is connected with the second member 12b. The dimension of the counter bores 18 may be determined as appropriate in accordance with the size of bolts used to secure the securing members 13. The counter bores 18 preferably has a dimension by which the bolts do not protrude from the surface 19. The second member 12b may be configured in the same manner as the first member 12a. By doing so, when the first member 12a and the second member 12b are connected, the bolts for securing the securing members 13 do not collide with each other at the connected surface (surface 19).

Body springs are attached to the rim members 11a, 11b and the flange member 12 of the wheel portion 10. The body springs are members that constitute the deformable ground contacting portion of the skeleton portion 2.

Figure 5:
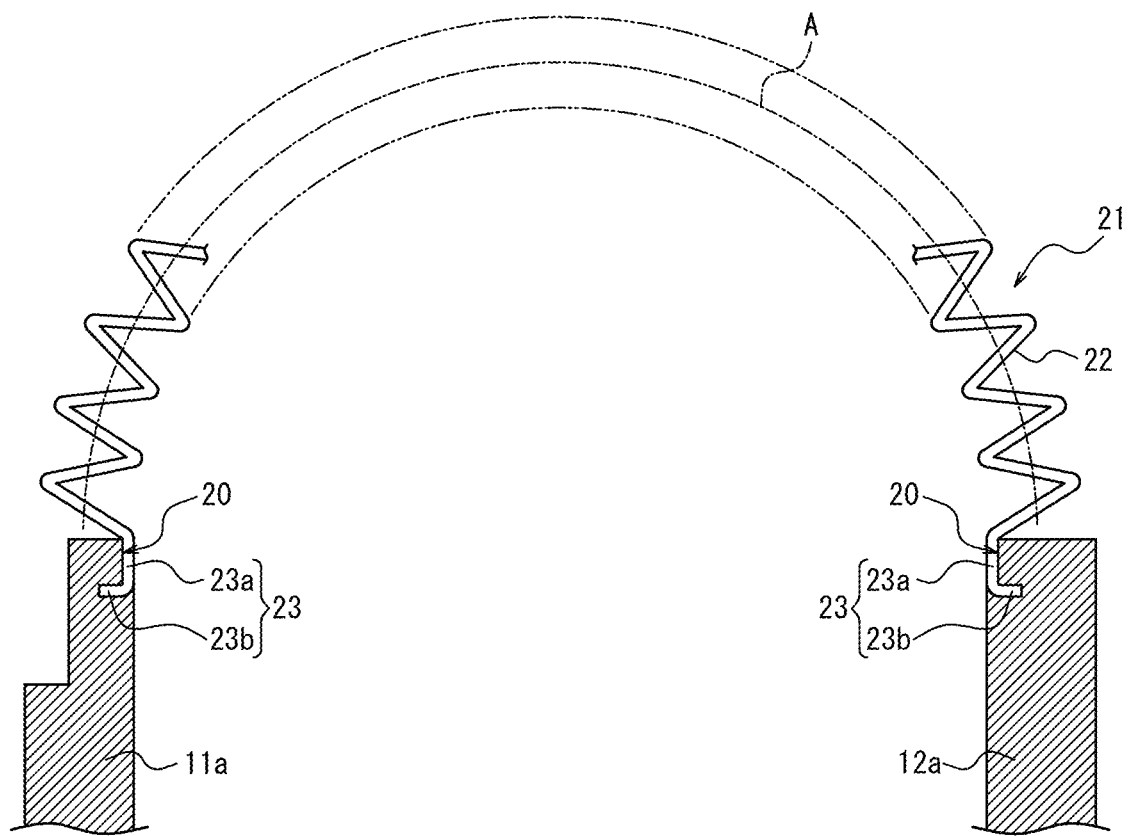
FIG. 5 is a schematic view illustrating how a body spring is fitted to the rim member and a flange member of FIG. 2.

Now, with reference to FIG. 5, how a body spring 21 is fitted to the rim member 11a or 11b and to the flange member 12 will be described. FIG. 5 is a schematic view illustrating how a body spring 21 is fitted to the rim member 11a and the flange member 12. This is a schematic sectional view of the skeleton portion 2, including the body spring 21, in the width direction of the vehicle wheel 1. In FIG. 5, part of the body spring 21, the rim member 11a, and the first member 12a is illustrated. In FIG. 5, a central part of the body spring 21 is illustrated in a simplified manner.

In the present embodiment, the body spring 21 is attached so that the rim member 11a and the first member 12a are connected, as schematically illustrated in FIG. 5. A body spring 21 is also attached so that the rim member 11b and the second member 12b are connected in the same manner as in FIG. 5. In the present embodiment, the body spring 21 is fitted between the rim member 11a and the first member 12a in the same manner as the body spring 21 fitted between the rim member 11b and the second member 12b. Accordingly, how it is fitted between the rim member 11a and the first member 12a will described herein.

In the present embodiment, the body spring 21 is made of metal. The body spring 21 includes an elastic deformable portion 22 and locking portions 23.

In the present embodiment, the elastic deformable portion 22 is configured by a coil spring. Here, the coil spring is a spring that elastically deforms in response to a load and that is coiled (spirally) around an axis A (axis of the body spring 21). An elastic deformable portion of an appropriate material and elasticity may be used as the elastic deformable portion 22, depending on the size and weight of the vehicle wheel 1 desired, the nature of the deformable ground contacting portion required, or the like.

The locking portions 23 are provided at both ends of the elastic deformable portion 22. The locking portions 23 lock the body spring 21 to the wheel portion 10. The locking portions 23 have a different shape from that of the elastic deformable portion 22. That is, in the present embodiment, the locking portions 23 have a shape other than a coil shape.

In the present embodiment, each locking portion 23 is configured by a member integral with the elastic deformable portion 22. That is, In the present embodiment, as illustrated for example in FIG. 5, a material that forms the elastic deformable portion 22 extends from the both ends of the elastic deformable portion 22, so as to form the locking portions 23.

In the present embodiment, as illustrated for example in FIG. 5, the locking portions 23 include straight portions that are formed in a straight line shape and that are connected to the both ends of the elastic deformable portion 22. In the present embodiment, as illustrated for example in FIG. 5, each locking portion 23 also includes a bent portion 23b that is bent with respect to the straight portion 23a at the end of the straight portion 23a. The bent portion 23b is bent perpendicularly to the straight portion 23a in a side view of the body spring 21 (in a plane including the axis A of the body spring 21).

In the present embodiment, the rim member 11a and the first member 12a each include, on its side on which the securing members 13 for connecting these members extend, an engaging receiver portion into which the bent portion 23b of the locking portion 23 can be inserted. In the present embodiment, the engaging receiver portion is configured as a bottomed hole into which the bent portion 23b of the locking portion 23 can be inserted. By inserting the bent portions 23b into the holes formed as the engaging receiver portions, the body spring 21 is engaged with the rim member 11a and the first member 12a at its both ends. In the example illustrated in FIG. 5, the holes in the engaging receiver portions are formed so as to extend in the width direction of the vehicle wheel 1. The length (hole depth) of the hole in each engaging receiver portion in a direction in which it extends is preferably greater than or equal to the length of each bent portion 23b. This enables the entire bent portion 23b to be inserted into the engaging receiver portion, and it is likely to be engaged stably. Additionally, the engaging receiver portion may be configured as a bottomless hole (through hole).

The sectional shape of the hole in the engaging receiver portion is not limited as long as the bent portion 23b can be inserted, and it may be, for example, elliptical, oval, rectangular, polygonal, or the like. In order for the elastic deformable portion 22 to be more reliably locked (fixed), the sectional shape and size of the hole is preferably approximately the same as the sectional shape and size of the bent portion 23b.

In the present embodiment, as illustrated in FIG. 5, the locking portions 23 provided at the both ends of the body spring 21 are disposed at positions corresponding to each other in the radial direction of the vehicle wheel 1. It is to be noted that the locking portions 23 provided at the both ends of the body spring 21 may be disposed at positions not corresponding to each other in the radial direction of the vehicle wheel 1.

As illustrated in FIG. 5, in a state in which the bent portions 23b are engaged with the engaging receiver portions, the straight portions 23a are disposed so as to extend from the positions of the engaging receiver portions to the outer side in the radial direction of the vehicle wheel 1 along surfaces of the rim member 11a and the first member 12a. In this way, as illustrated in FIG. 5, part (e.g., central part) of the body spring 21 in the width direction of the vehicle wheel 1 protrudes further to the outer side in the radial direction of the vehicle wheel 1 than the rim member 11a and the first member 12a. Accordingly, a load on the vehicle wheel 1 is supported by the body spring 21.

On the surfaces of the rim member 11a and the first member 12a, grooves 20 into which the straight portions 23a can be placed are formed, as illustrated in FIG. 5. The straight portions 23a may be placed into the grooves 20. By thus providing the grooves 20, the straight portions 23a are stably attached to the rim member 11a and the first member 12a.

In the present embodiment, as illustrated in FIG. 5, the body spring 21 is attached to peripheral portions of the rim member 11a and the first member 12a in a manner such that the axis A of the body spring 21 extends from the peripheral portions of the rim member 11a and the first member 12a to the outer side in the radial direction of the vehicle wheel 1. The peripheral portions of the rim member 11a and the first member 12a refer to outer ends of the rim member 11a and the first member 12a in the radial direction of the vehicle wheel 1. Due to the body spring 21 being thus attached to the peripheral portions of the rim member 11a and the first member 12a in a manner such that the axis A of the body spring 21 extends to the outer side in the radial direction of the vehicle wheel 1, a load on the vehicle wheel 1 can be supported by the body spring 21 in the direction of the axis A. The load can therefore be supported by fully using elastic force of the body spring 21.

In the present embodiment, the axis A of the body spring 21 forms an angle of 0° with respect to the radial direction at the peripheral portions. The axis A of the body spring 21 does not necessarily have to form an angle of 0° with respect to the radial direction at the peripheral portions. The axis A of the body spring 21 preferably forms an angle of less than or equal to 30° with respect to the radial direction at the peripheral portions. In this case also, elastic force of the body spring 21 can be fully used to support a load. The axis A of the body spring 21 more preferably forms an angle of less than or equal to 20° with respect to the radial direction at the peripheral portions, and even more preferably forms an angle of less than or equal to 10° with respect to the radial direction at the peripheral portions. The closer the angle formed between the radial direction and the axis A of the body spring 21 at the peripheral portions is to 0°, the more preferable it is. This is because elastic force of the body spring 21 can be more fully used as the angle gets closer to 0°. In a case in which the axis A of the body spring 21 is inclined with respect to the radial direction at the peripheral portions, it is preferably inclined in a direction toward the center of the tire portion 4a or 4b. This prevents collision between the body spring 21 that constitutes the tire portion 4a and the body spring 21 that constitutes the tire portion 4b.

A plurality of body springs 21 are provided at intervals from each other over the entire circumferential direction of the vehicle wheel 1. That is, the body springs 21 are provided over the entire circumference of the wheel portion 10, with the locking portions 23 being engaged with the rim member 11a and the first member 12a in a manner described above. The number and intervals of the body springs 1 to be engaged with the rim member 11a and the first member 12a may be determined as appropriate in accordance with the size and weight of the vehicle wheel 1, the nature of the deformable ground contacting portion required, or the like.

Additionally, an engagement assist member (which is not illustrated) may be attached to the wheel portion 10 for assisting in a state of engagement of the bent portions 23b engaged with the engaging receiver portions from the sides between which the securing members 13 extend. The engagement assist member may be configured, for example, by a plate-shaped member, and it may be secured to the rim member 11a and the first member 12a, so as to support the bent portions 23b and prevent them from slipping out of the holes formed as the engaging receiver portions. In a case in which an engagement assist member is included, the locking portions 23 are more stably engaged with the rim member 11a and the first member 12a.

Figure 6:
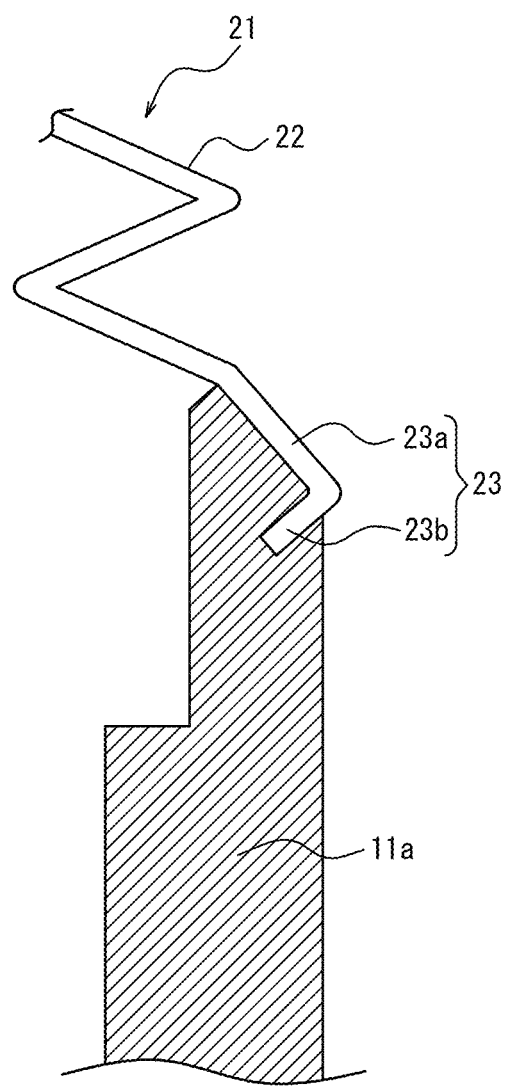
FIG. 6 is a schematic view illustrating a modification of the rim member.

Additionally, in the rim members 11a, 11b and in the first member 12a and the second member 12b, the configuration of the holes in the engaging receiver portions with which the bent portions 23b of the body spring 21 engage is not limited to the example of FIG. 5. For example, in the example illustrated in FIG. 5, the holes in the engaging receiver portions are described as being formed so as to extend along the width direction of the vehicle wheel 1 (i.e., at an angle of 0° with respect to the width direction of the vehicle wheel 1). The holes in the engaging receiver portions, however, do not necessarily have to be formed so as to extend along the width direction of the vehicle wheel 1. FIG. 6 is a schematic view illustrating a modification of the rim member 11a. As illustrated as an example in FIG. 6, the holes in the engaging receiver portions may be formed so as to extend in a direction that is inclined with respect to the width direction of the vehicle wheel 1. Similarly, in the first member 12a and the second member 12b, the holes in the engaging receiver portions may be formed so as to extend in a direction that is inclined with respect to the width direction of the vehicle wheel 1. In this case also, by inserting the bent portions 23b into the holes in the engaging receiver portions, the body springs 21 may be engaged with the rim member 11a, 11b and the first member 12a and the second member 12b.

In the skeleton portion 2 of the vehicle wheel 1 according to the present embodiment, the plurality of body springs 21 thus engaged with the wheel portion 10 is linked with linking springs, to thereby form the deformable ground contacting portion. That is, in the present embodiment, the deformable ground contacting portion is configured by two types of springs, namely, the body springs 21 and the linking springs. The linking springs are linked to the body springs 21 so as to restrict relative displacement of the body springs 21 from each other. That is, in the present embodiment, each linking spring functions as a linking member that links adjacent body springs 21. Specifically, each linking springs is disposed between two body springs 21 adjacent in the circumferential direction that are engaged with the wheel portion 10, and interlaced and linked to these two body springs 21.

In the present embodiment, each linking spring has an elastic deformable portion. The elastic deformable portion is configured by a coil spring. An elastic deformable portion of an appropriate material and elasticity may be used as the elastic deformable portion, depending on the size and weight of the vehicle wheel 1 desired, the nature of the deformable ground contacting portion required, or the like. The diameter of the coil spring constituting the elastic deformable portion of each linking spring is preferably close to that of the coil spring constituting the elastic deformable portion 22 of each body spring 21. Here, the diameter of the coil spring is a diameter of its circumscribed circle when the coil spring is viewed from the axial direction, and the same applies hereinafter. The closer the diameter of the coil spring constituting the elastic deformable portion of the linking spring is to the diameter of the coil spring constituting the elastic deformable portion 22 of the body spring 21, the more evenly force is distributed when the coil spring constituting the elastic deformable portion 22 of the body spring 21 and the coil spring constituting the elastic deformable portion of the linking spring are linked to thereby form the deformable ground contacting portion, as described below. For example, the diameter of the coil spring constituting the elastic deformable portion 22 of the body spring 21 and the diameter of the coil spring constituting the elastic deformable portion of the linking spring may both be from 15 mm to 25 mm, such as 20 mm.

Figure 7A:
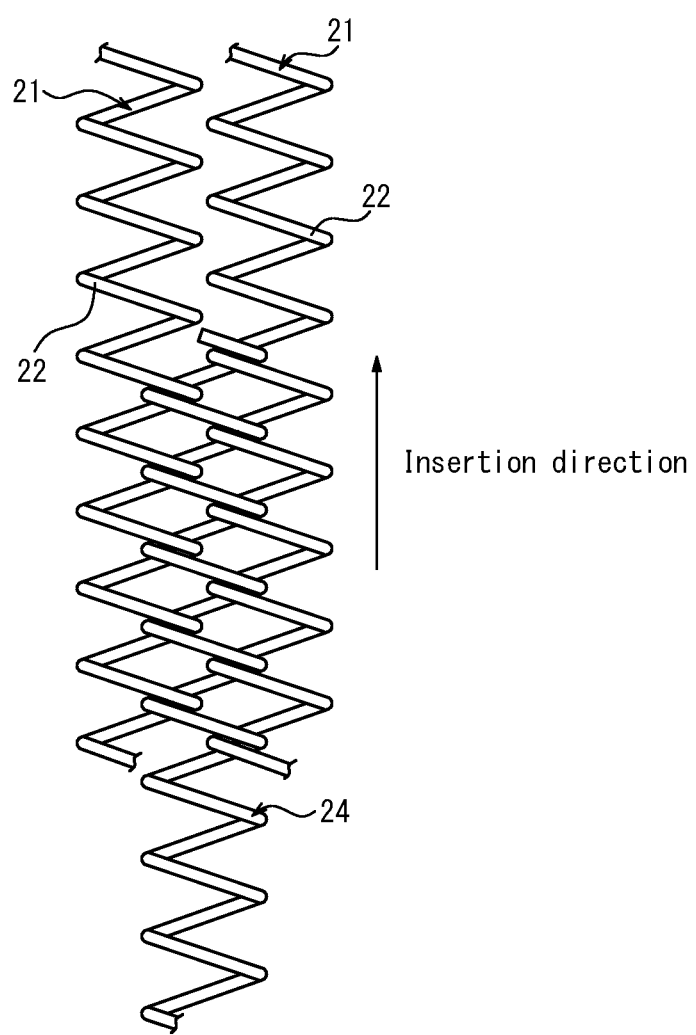
FIG. 7A is a schematic view illustrating an example of a method for linking a linking spring to body springs of FIG. 5.
Figure 7B:
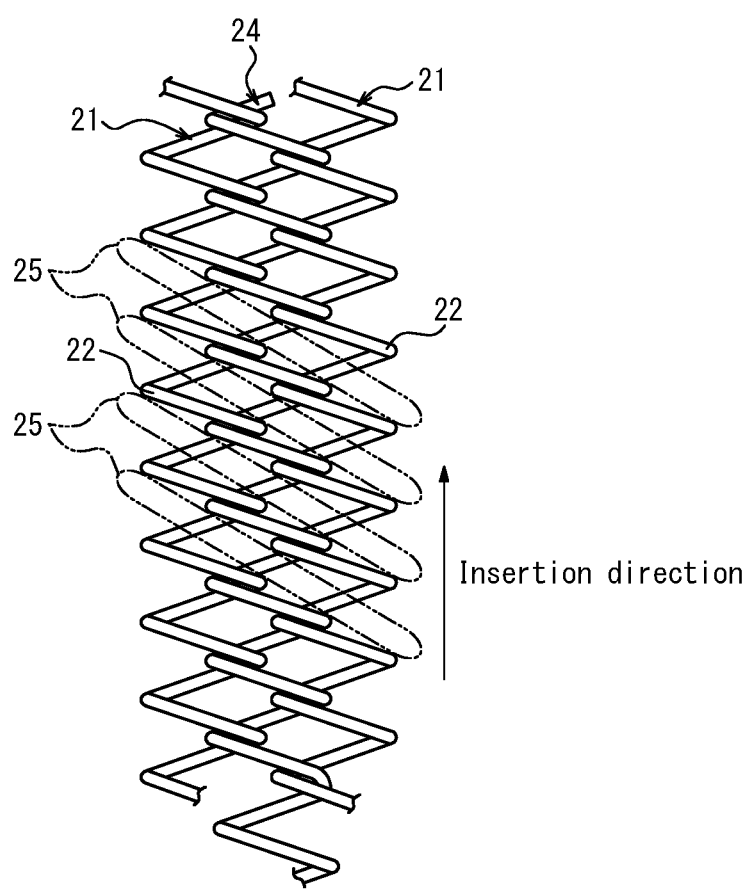
FIG. 7B is a schematic view illustrating an example of the method for linking the linking spring to the body springs of FIG. 5.

FIG. 7A and FIG. 7A are schematic views illustrating examples of a method for linking a linking spring 24 to body springs 21. As illustrated in FIG. 7A, the linking spring 24 is hooked to elastic deformable portions 22 of two adjacent body springs 21 engaged with the wheel portion 10, so that it is interlaced and linked to these two body springs 21. Specifically, the linking spring 24 is linked to two body springs 21 that are adjacent in the circumferential direction so as to restrict relative displacement between these two body springs 21. At this time, the linking spring 24 is inserted into the body springs 21 as it advances while rotating, so that it is gradually interlaced with the two adjacent body springs 21. In this way, the whole linking spring 24 is linked to the two body springs 21, as illustrated in FIG. 7B.

Additionally, in the present embodiment, both ends of each linking spring 24 are not secured to the wheel portion 10. That is, in the present embodiment, the both ends of the linking spring 24 are left unsecured. The linking spring 24 may, however, have only one of the both ends secured to the wheel portion 10.

In the present embodiment, all the body springs 21 engaged with the wheel portion 10 are linked with linking springs 24, in a manner such that a linking spring 24 is disposed between two adjacent body springs 21. In the present embodiment, the skeleton portion 2 is configured in this way. That is, in the present embodiment, each body spring 21 in the deformable ground contacting portion of the skeleton portion 2 is linked with two linking springs 24, and each linking spring 24 in the deformable ground contacting portion of the skeleton portion 2 is linked to two body springs 21. Due to a linking spring 24 being thus linked between two adjacent body springs 21, even when a load is applied to the skeleton portion 2, a distance between the body springs 21 does not become too large, thus allowing them to maintain their functions as the vehicle wheel 1.

The length of each linking spring 24 may be determined as appropriate in accordance with the size and weight of the vehicle wheel 1 desired, the nature of the deformable ground contacting portion required, or the like. The length (extended length) of the elastic deformable portion of each linking spring 24 is preferably smaller than the length (extended length) of the elastic deformable portion 22 of each body spring 21. The linking spring 24 preferably has a length that allows the elastic deformable portion to extend over the entire width direction of the tire. This enables at least part of the elastic deformable portion 22 of the body spring 21 that contacts the ground to be linked with the elastic deformable portion of the linking spring 24.

The vehicle wheel 1 according to the present embodiment is configured with the skeleton portion 2 described above, and tread members that form the tread portion 3 and that are fitted to an outer periphery of the skeleton portion 2. The tread members are fitted to the skeleton portion 2 so that they extend over the entire width direction of each tire of the skeleton portion 2, as illustrated for example in FIG. 1. The tread members are fitted at least to the ground contacting portion of the skeleton portion 2 that is formed by body springs 21 and linking springs 24. Each tread member may be configured, for example, with a non-woven fabric. The non-woven fabric may be made of metal, for example. The use of a metallic non-woven fabric allows a desired vehicle wheel 1 to be used even in environments with large temperature fluctuations. The tread members will be described herein as being configured with a metallic non-woven fabric.

The tread members are fitted to the skeleton portion 2, for example, by slotting them into grooves formed on a surface of the skeleton portion 2 that is located on the outer side in the radial direction of the vehicle wheel 1 in a state in which body springs 21 and linking springs 24 are interlaced. Specifically, in the present embodiment, the body springs 21 are attached so as to extend along the width direction of the vehicle wheel 1 (i.e., at an angle of 0° with respect to the width direction of the vehicle wheel 1) in the wheel portion 10. Accordingly, the linking springs 24 that have been interlaced with the body springs 21 also extend along the width direction of the vehicle wheel 1 in the wheel portion 10. In a case in which body springs 21 and linking springs 24 extend along the width direction of the vehicle wheel 1 in this way, the body springs 21 and the linking springs 24 form grooves 25 in the skeleton portion 2 that are depressed from its surface located on the outer side in the radial direction of the vehicle wheel 1, as illustrated by dashed lines in FIG. 7B.

In the present embodiment, the tread members are fitted to the grooves 25 formed by body springs 21 and linking springs 24. At this time, each tread member 30 is fitted so that at least part of it is embedded in a groove 25, as illustrated for example in FIG. 8. Fitting the tread member 30 so that at least part of it is embedded in the groove 25 prevents it from falling out of the groove 25. In the present embodiment, the tread member 30 is fitted so that only part of the tread member 30, that is, only part of the tread member 30 that is located on the inner side in the radial direction of the vehicle wheel 1, is embedded in the groove 25. Part of the tread member 30 that is located on the outer side in the radial direction of the vehicle wheel 1 is exposed from the groove 25 to the outer side in the radial direction of the vehicle wheel 1. By fitting the tread member 30 in this way, vibration or the like during driving can be prevented. The tread member 30 may, however, be fitted so that its entirety is embedded in the groove 25. In this case, the tread member 30 is prevented from falling out of the groove 25. In the present embodiment, as illustrated in FIG. 1, the tread members 30 are embedded in all the grooves 25 formed in the skeleton portion 2. The tread members 30, however, do not necessarily need to be embedded in all the grooves 25. For example, the tread members 30 may be embedded in only some of the grooves 25 formed in the skeleton portion 2. In this case, the weight of the vehicle wheel 1 can be reduced.

In the present embodiment, the tread members 30 are preferably detachably fitted to the skeleton portion 2. Due to the tread members 30 being detachably fitted to the skeleton portion 2, in a case in which the tread members 30 are worn, for example, the tread members 30 can be removed from the skeleton portion 2 and replaced.

Figure 8:
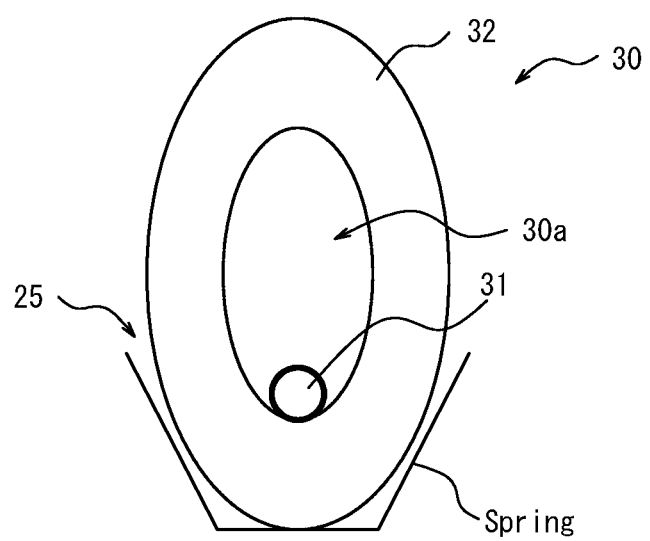
FIG. 8 is a schematic view illustrating a state in which a tread member is fitted to the skeleton portion.

In the present embodiment, each tread member 30 is configured by a non-woven fabric 32, as schematically illustrated for example in FIG. 8. The tread member 30 can be configured in the form of a rod with a through hole 30*a* at its center in the sectional view taken along the direction in which it extends. In the tread member 30, the non-woven fabric 32 may be configured in the form of an elongated rod with an approximately circular section. Here, the approximately circular shape includes not only a perfectly circular shape, but also a distorted circular shape (e.g., an oval shape as schematically illustrated in FIG. 8) or a shape wherein its section has an uneven outer periphery. The through hole 30*a* provided in the tread member 30 is a hole through which a core material 31 can pass. The core material 31 extends along the direction in which the tread member 30 extends. The core material 31 can be configured, for example, by a coil spring with a small pitch and small wire diameter.

Figure 9A:
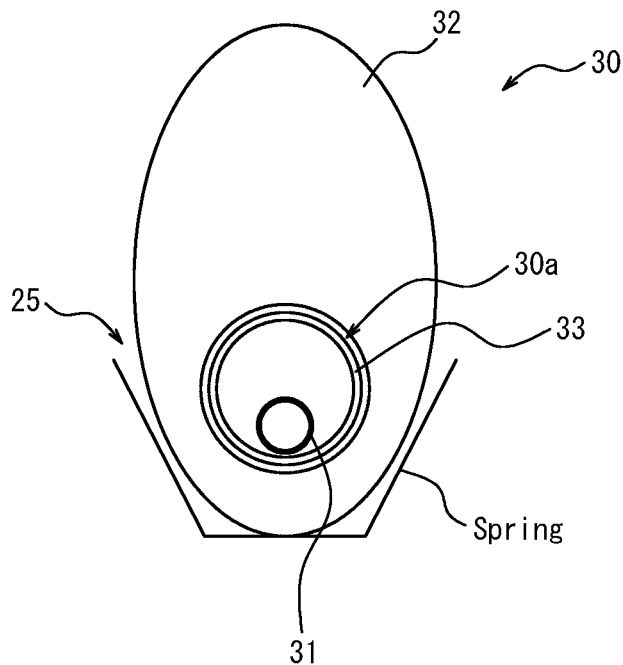
FIG. 9A is a schematic view illustrating a modification of the tread member.
Figure 9B:
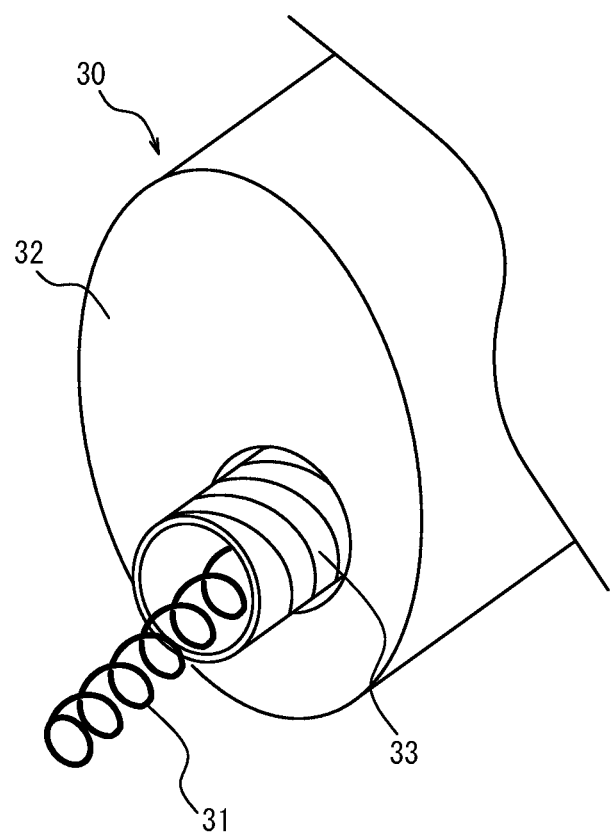
FIG. 9B is a schematic view illustrating the modification of the tread member.

The tread member 30 is not limited to the example illustrated in FIG. 8. For example, as illustrated in FIG. 9A and FIG. 9B, the tread member 30 may be provided, in the through hole 30*a*, with a reinforcement member 33 for reinforcing the through hole 30*a*. The reinforcement member 33 may be configured, for example, by a coil spring with a small pitch. The core material 31 is disposed in the cylindrical reinforcement member 33. By providing the reinforcement member 33, the core material 31 can be prevented from biting into the non-woven fabric 32 compared with a case without the reinforcement member 33. Further, durability of the tread member 30 is also improved by the reinforcement member 33 protecting the core material 31. Moreover, the reinforcement member 33 can store and retain the heat transferred from the wheel portion 10 or the like and the heat generated by the tread member 30, thereby preventing overcooling of the tread member 30 in a very low temperature environment.

Figure 10A:
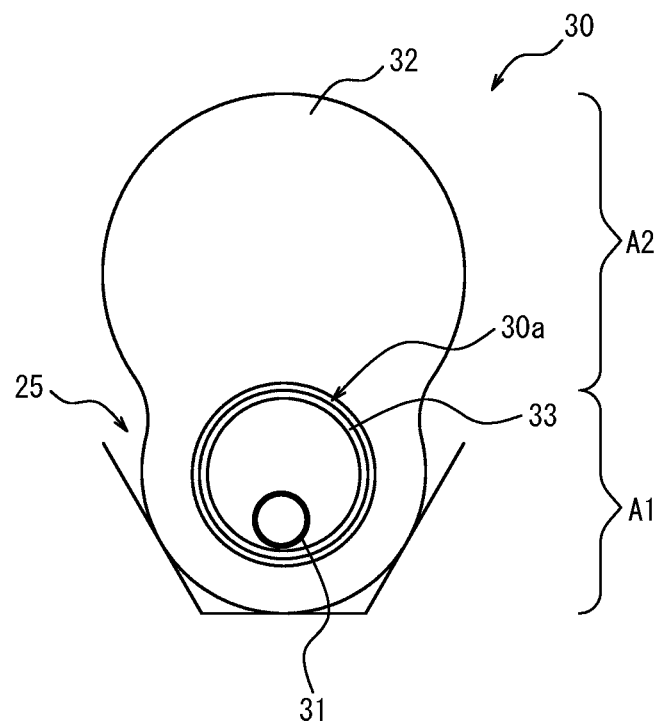
FIG. 10A is a schematic view illustrating another modification of the tread member.
Figure 10B:
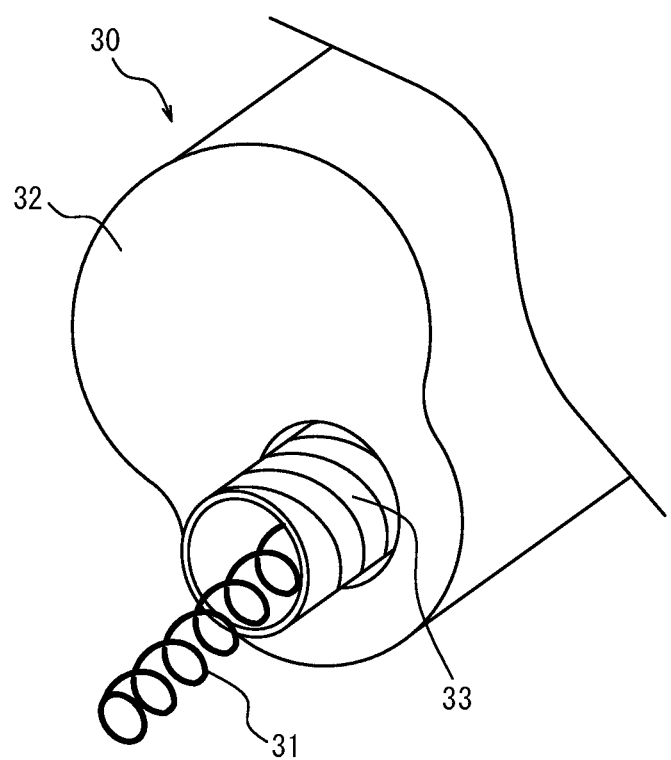
FIG. 10B is a schematic view illustrating still another modification of the tread member.

The tread member 30 may also have a shape with an hourglass-shaped section, as illustrated for example in FIG. 10A and FIG. 10B. In this case, the tread member 30 has a secured area A1 that is embedded in a groove 25, and a ground contacting area A2 that contacts the ground. The ground contacting area A2 is provided on the outer side in the radial direction of the vehicle wheel 1 relative to the secured area A1. In the tread member 30, a through hole 30a is provided in the secured area A1, and the through hole 30a is provided with a reinforcement member 33a. A core material 31 is disposed in the reinforcement member 33. In the section, the width of the ground contacting area A2 is greater than that of the secured area A1.

In the present embodiment, the tread member 30 preferably further includes a fastening member for fastening the tread member 30 to the skeleton portion 2. This further prevents the tread member 30 from coming off the skeleton portion 2. The fastening member may be of any configuration capable of fastening the tread member 30 to the skeleton portion 2.

For example, in a case in which the tread member 30 is configured in the form of a bar, as in the example illustrated in FIG. 8, the tread member 30 may include a fastening member that extends from both ends of the bar-shaped tread member 30 along the direction in which the tread member 30 extends. For example, the tread member 30 may include a fastening member that extends along the direction in which the core material 31 extends. In this case, the core material 31 and the fastening member may be configured as a single member. Specifically, a coil spring having the functions of the core material 31 and the fastening member is inserted into the through hole 30a and fastened to the skeleton portion 2, so that the tread member 30 is fastened to the skeleton portion 2. It is sufficient that at least one coil spring is used for each tread member 30, and several coil springs may also be used for each tread member 30. The embodiment of the fastening member is, however, not limited to this. The fastening member may be configured, for example, as a separate member independent of the tread member 30.

Thus, the vehicle wheel 1 according to the present embodiment includes the tread members 30 disposed at least around the outer periphery of the skeleton portion 2. Accordingly, even in a case in which the vehicle wheel 1 according to this embodiment is used to drive on sandy soil or the like, for example, the tread members 30 can prevent foreign substances, such as sand, from entering the inner side (i.e., closer to the rotation center) of the vehicle wheel 1. This prevents deterioration in running performance of the vehicle wheel 1.

In each of the plurality of tire portions, tread members 30 are arranged in one direction with respect to the rotation axis of the tire portion. Specifically, as illustrated in FIG. 7B, grooves 25 in which the tread members 30 are to be embedded are formed in one direction. Accordingly, by embedding the tread members 30 in the grooves 25, the tread members 30 are arranged in the one direction, and a pattern that goes in one direction is formed in the tread portion 3. Directions and pitches of patterns to be formed on the plurality of tire portions in the tread portion 3 can be determined as appropriate individually for each tire portion.

Arrangement of tread members 30 is determined by positions at which coil springs (in the present embodiment, body springs 21 and linking springs 24) that form the deformable ground contacting portion are attached to a rim member and/or a flange member, and the direction in which the springs are wound. For example, in a case in which body springs 21 are disposed at positions corresponding to each other in the width direction of the vehicle wheel 1 as in the above embodiment, the grooves 25 are formed so as to be inclined at a predetermined angle with respect to the width direction of the vehicle wheel 1 as illustrated in FIG. 7B. Accordingly, arrangement of tread members 30 is also formed so as to be inclined at a similar angle. By varying the positions at which the body springs 21 are attached to the rim member and/or the flange member, the inclination angle of arrangement of the tread members 30 with respect to the width direction of the vehicle wheel 1 can be changed. The tread members 30 can therefore be arranged in the same direction as the width direction of the vehicle wheel 1, depending on the positions at which the body springs 21 are attached to the rim member and/or the flange member. In a case in which the springs are wound in opposite directions, even when the body springs 21 are attached to positions corresponding to each other on the rim members and/or the flange member, grooves 25 are formed at different angles with respect to the width direction of the vehicle wheel 1. Thus, the arrangement direction of the tread members 30 formed on each tire portion can change depending on the winding direction of the springs.

The pitch of arrangement of tread members 30 formed in each of the plurality of tire portions is determined by the spring pitch of coil springs that form the deformable ground contacting portion. For example, the larger the pitch of body springs 21 and linking springs 24, the larger the width of the grooves 25, and therefore, the larger the pitch of arrangement of the tread members 30. In contrast, the smaller the pitch of body springs 21 and linking springs 24, the smaller the width of the grooves 25, and therefore the smaller the pitch of arrangement of the tread members 30.

Thus, by changing positions at which coil springs that form the deformable ground contacting portion are attached to the rim members and/or the flange member, the winding direction of the springs, and the pitch of the springs as appropriate, various patterns of arrangement of tread members 30 can be achieved in the tire portions.

In the plurality of tire portions, arrangement of tread members 30 in one tire portion may be different from that in another tire portion. With reference now to FIG. 11A to FIG. 11E, some examples of arrangement of tread members 30 in a case in which the vehicle wheel 1 includes two tire portions 4a, 4b as in the above embodiment will be described. FIG. 11A to FIG. 11E are views schematically illustrating different examples of arrangement of tread members 30 in the vehicle wheel 1.

Figure 11A:
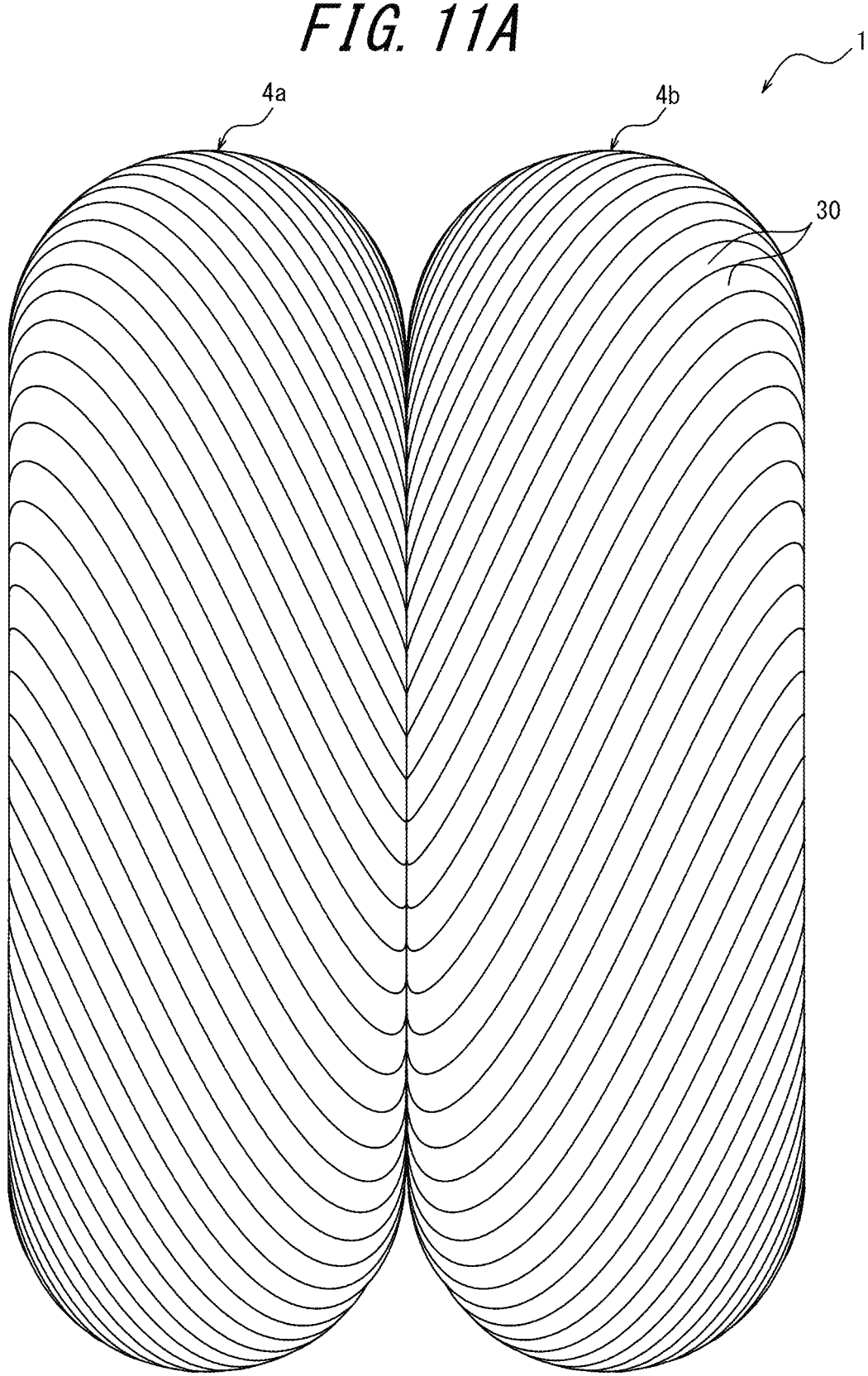
FIG. 11A is a view schematically illustrating an example of arrangement of tread members in the vehicle wheel.

For example, in the vehicle wheel 1, a direction in which tread members 30 are arranged with respect to the rotation axis of the tire portions 4a, 4b in the tire portion 4a may be different from that in the tire portion 4b. For example, as illustrated in FIG. 11A, the direction in which tread members 30 are arranged with respect to the rotation axis of the tire portions 4a, 4b in the tire portion 4a and that in tire portion 4b may be symmetrical. Such arrangement is achieved, by forming the two tire portions 4a, 4b by attaching body springs 21 that have the same pitch and different winding directions to the rim members and/or flange member at positions corresponding to each other in the width direction of the vehicle wheel 1. Such arrangement of the tread members 30 of the vehicle wheel 1 is V-shaped, as illustrated in FIG. 11A. According to arrangement of tread members 30 like this, when the vehicle wheel 1 rotates so as to drive the vehicle, a load applied to the vehicle wheel 1 is likely to be equally balanced between left and right sides in the two tire portions 4*a*, 4*b*.

Figure 11B:
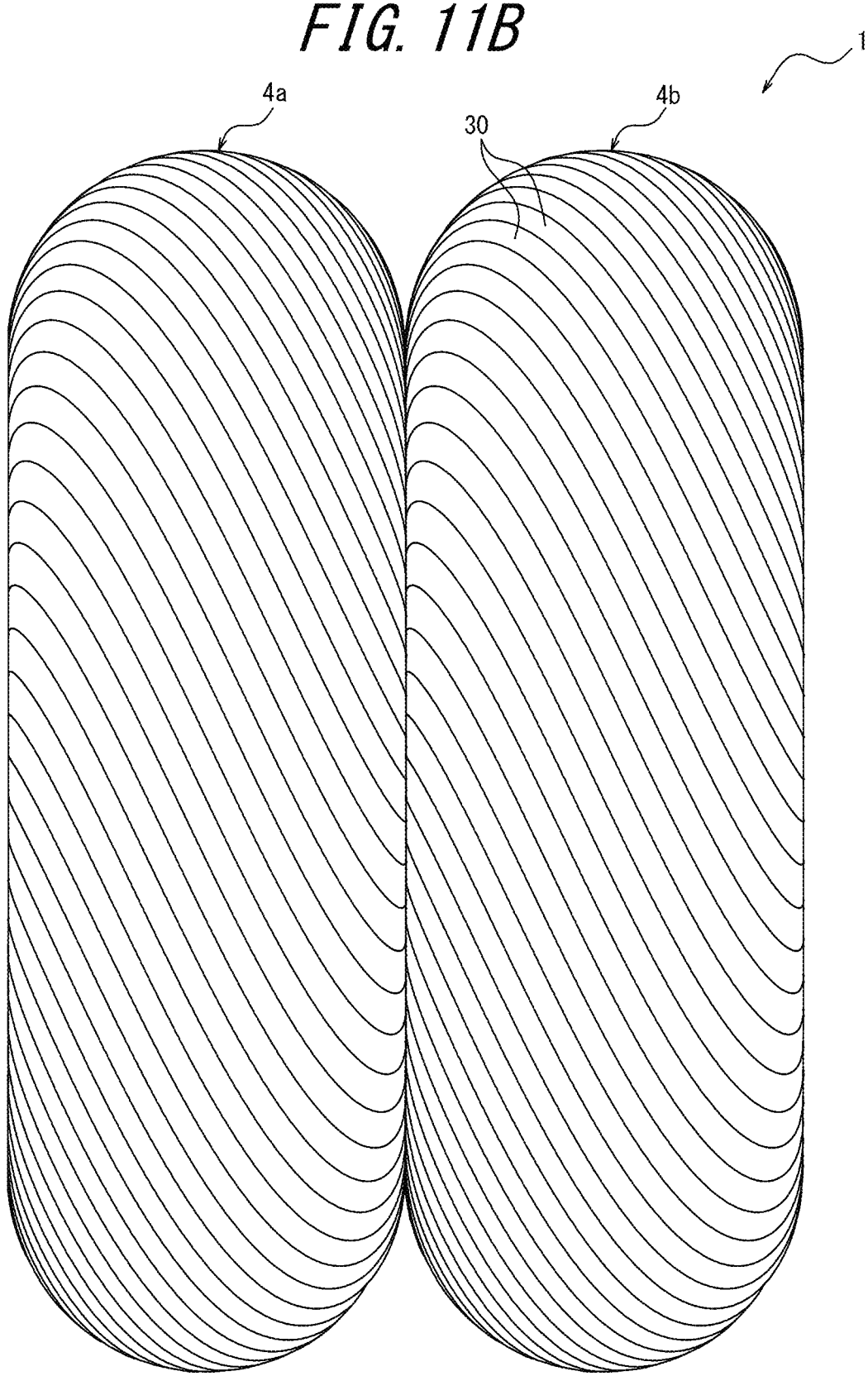
FIG. 11B is a view schematically illustrating another example of arrangement of tread members in the vehicle wheel.

For example, as illustrated in FIG. 11B, in the vehicle wheel 1, tread members 30 of the two tire portions 4*a*, 4*b* may have the same arrangement. Such arrangement may be achieved, by forming the two tire portions 4*a*, 4*b* by attaching body springs 21 that have the same pitch and winding direction equally to the rim members and/or the flange member that form the four tire portions 4*a*, 4*b*. According to a tread pattern like this, traction can be enhanced compared with a vehicle wheel 1 with one tire portion.

Figure 11C:
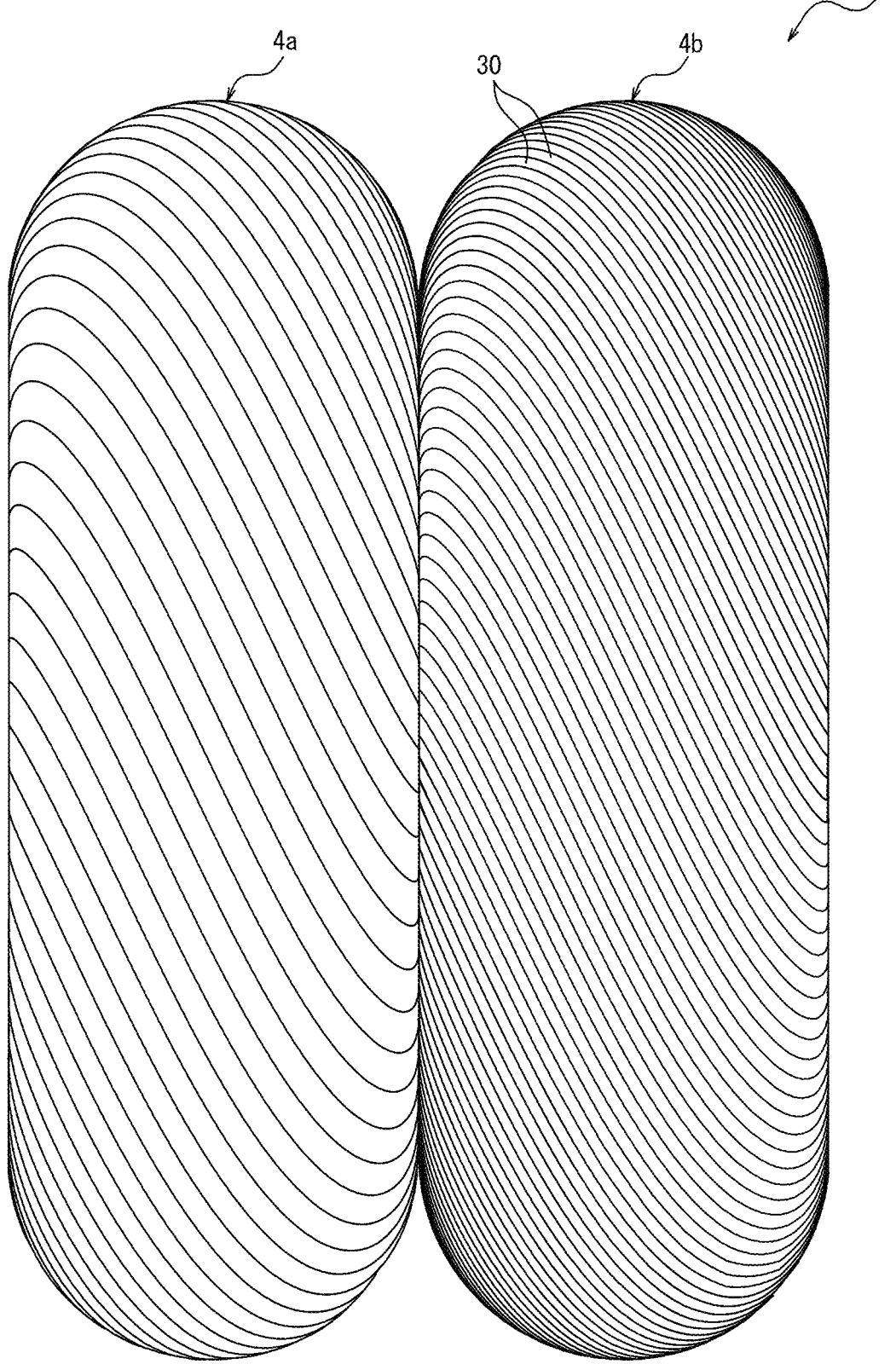
FIG. 11C is a view schematically illustrating still another example of arrangement of tread members in the vehicle wheel.

For example, in the vehicle wheel 1, a pitch with which tread members 30 are arranged in the tire portion 4*a* may be different from that in the tire portion 4*b*. For example, as illustrated in FIG. 11C, the pitch with which tread members 30 are arranged in the tire portion 4*a* may be larger than that in the tire portion 4*b*. Such arrangement can be achieved, by using body springs 21 that have different pitches and the same winding direction. According to arrangement of tread members 30 like this, even in a case in which a road surface environment in which a vehicle with the vehicle wheel 1 travels is not suitable for an arrangement pitch on one side and traction cannot be easily applied, an arrangement pitch on the other side allows traction to be applied. This makes the vehicle wheel 1 as a whole adaptable to driving in a wide variety of road surface environments.

Figure 11D:
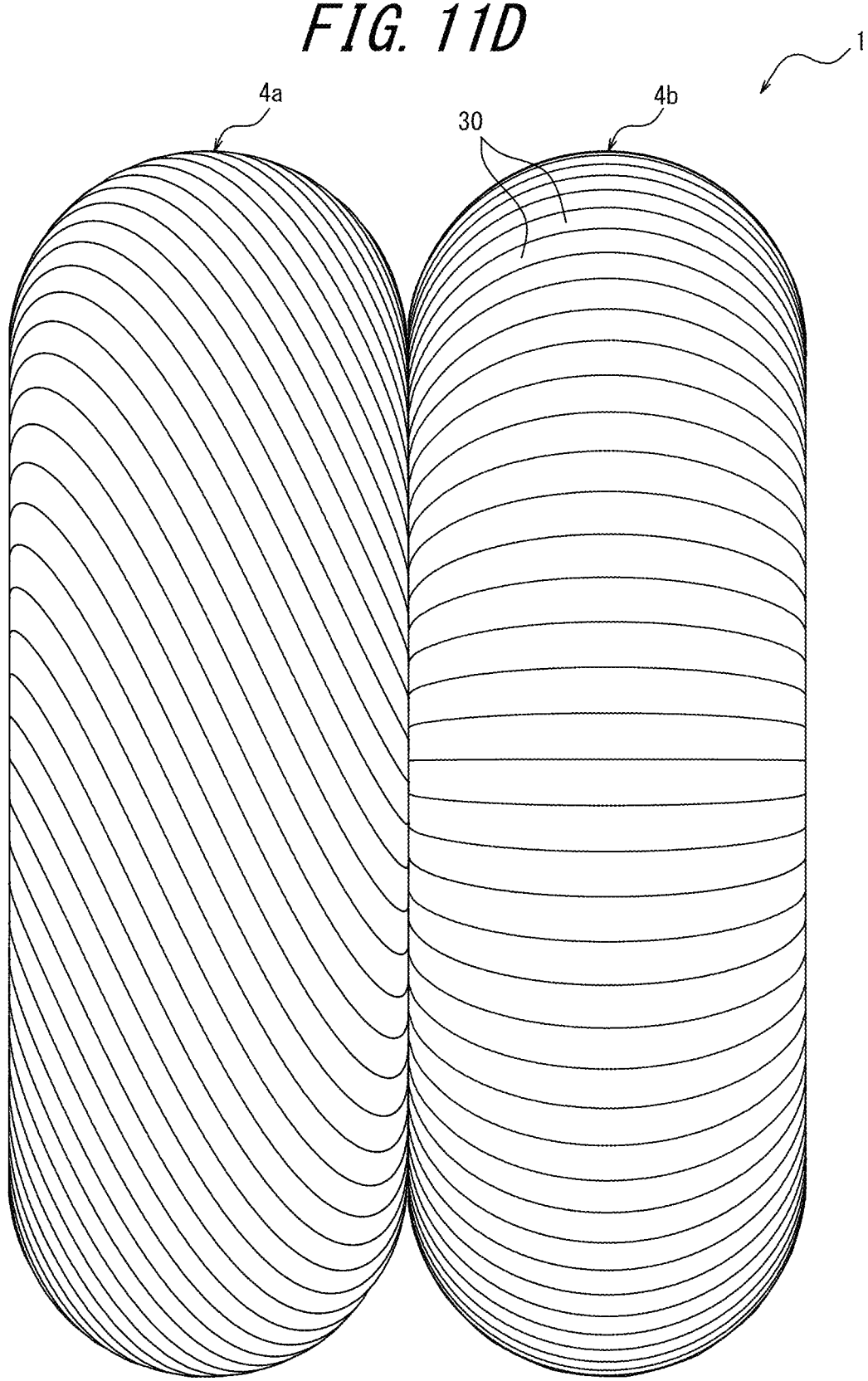
FIG. 11D is a view schematically illustrating still another example of arrangement of tread members in the vehicle wheel.

For example, as illustrated in FIG. 11D, in the vehicle wheel 1, a direction in which tread members 30 are arranged in the tire portion 4*a* may be different from that in the tire portion 4*b*. Such arrangement can be achieved, by attaching both ends of body springs 21 to the rim members and/or the flange member at positions not corresponding to each other. According to arrangement of tread members 30 like this, even in a case in which a road surface environment in which a vehicle with the vehicle wheel 1 travels is not suitable for an arrangement direction on one side and traction cannot be easily applied, an arrangement direction on the other side allows traction to be applied. This makes the vehicle wheel 1 as a whole adaptable to driving in a wide variety of road surface environments.

Figure 11E:
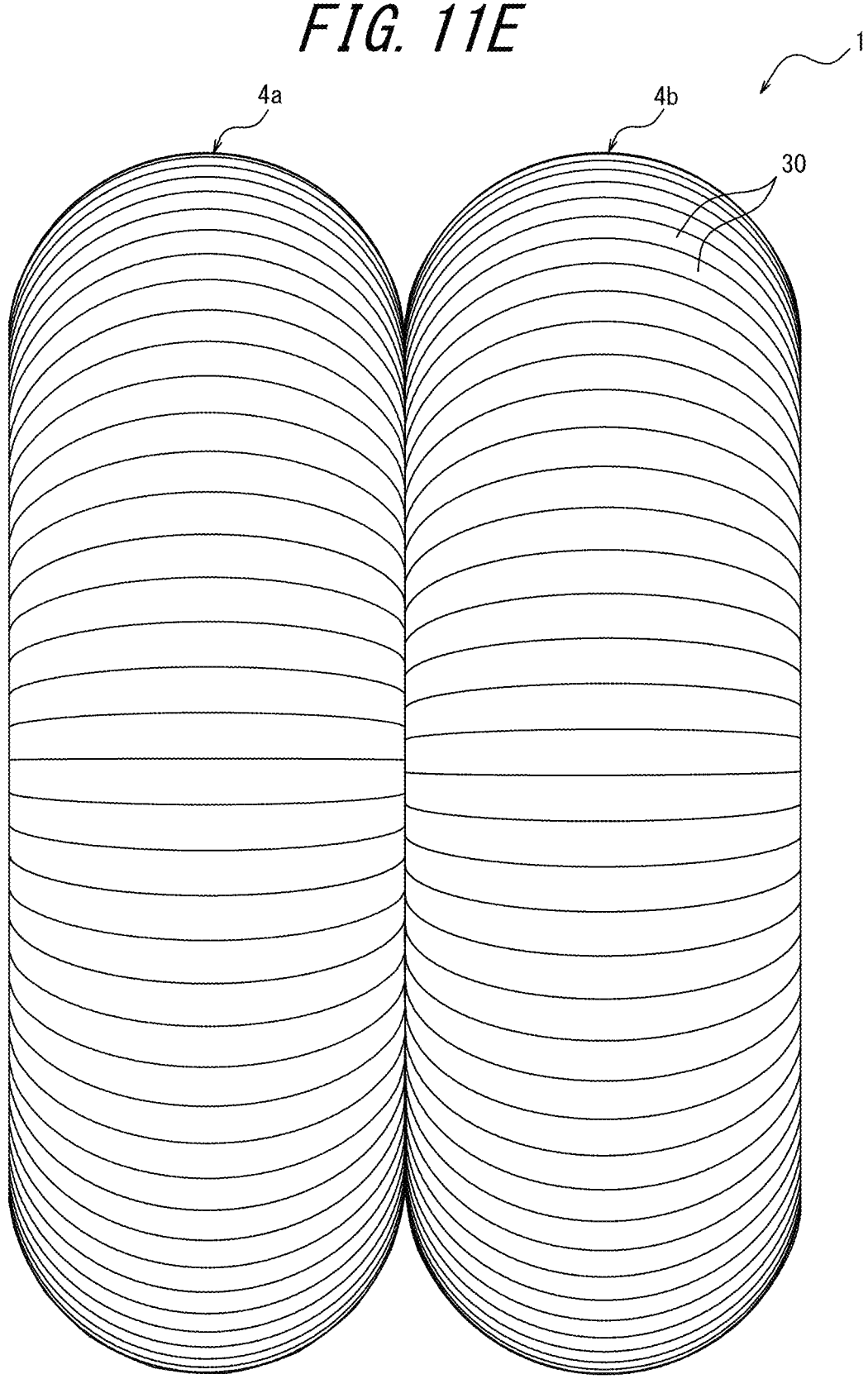
FIG. 11E is a view schematically illustrating still another example of arrangement of tread members in the vehicle wheel.

For example, as illustrated in FIG. 11E, in the vehicle wheel 1, a topology in which tread members 30 are arranged in the tire portion 4*a* may be configured to be different from that in the tire portion 4*b*. Such arrangement may be achieved, by attaching both ends of body springs 21 to the rim members and/or the flange member so that attachment positions on the rim member and/or the flange member that form(s) the tire portion 4*a* are unaligned to those on the rim member and/or the flange member that form(s) the tire portion 4*b*. According to arrangement of tread members 30 like this, the two tire portions 4*a*, 4*b* are able to exert traction at different timings.

Combinations of arrangement of tread members 30 in the tire portions 4*a*, 4*b* are not limited to the examples illustrated here, and any combinations can be used. Thus, in the vehicle wheel 1 according to the present embodiment, a pattern that goes in one direction can be formed in each of the plurality of tire portions 4*a*, 4*b*, and combining the tire portions 4*a*, 4*b*, each with a pattern that goes in one direction, can provide a greater degree of freedom for surface patterns.

Although each tread member 30 is described as being configured with a metallic non-woven fabric, the material of the tread member 30 is not limited to the metallic non-woven fabric. For example, the entire tread member 30 may be configured by silicon rubber.

For example, each tread member 30 may be made of rubber. For example, the tread member 30 may be composed of natural rubber (NR) and synthetic rubber. Example of synthetic rubber may include butadiene rubber (BR), styrene-butadiene rubber (SBR), isoprene rubber (IR), butyl rubber (IIR), halogenated butyl rubber, chloroprene rubber (CR), acrylonitrile-butadiene rubber (NBR), ethylene-propylene-diene rubber (EPDM), or the like. One type of rubber may be used alone, or two or more types of rubber may be used in combination.

The vehicle wheel 1 according to the present embodiment can be assembled for example as follows. That is, first, a plurality of body springs 21 are attached to the rim member 11*a* and the first member 12*a* as illustrated in FIG. 5. A plurality of body springs 21 are similarly attached to the rim member 11*b* and the second member 12*b*. Subsequently, as illustrated in FIG. 7A and FIG. 7B, linking springs 24 are linked to the body springs 21. Then, the rim member 11*a* and the first member 12*a* are secured by the securing members 13, to thereby fix the tire width of the tire portion 4*a*. The rim member 11*b* and the second member 12*b* are similarly secured by the securing members 13, to thereby fix the tire width of tire portion 4*b*. Subsequently, the first member 12*a* and the second member 12*b* are bolted together so as to form the flange member 12. The spoke members 14*a*, 14*b* are then attached. Finally, the tread members 30 are fitted, and assembly of the vehicle wheel 1 is completed.

As explained above, the vehicle wheel 1 according to the present embodiment includes one flange member 12 between two rim members 11*a*, 11*b*. A plurality of body springs 21 are attached to the flange member 12 and the respective rim members 11*a*, 11*b*. Linking springs 24 are linked to the body springs 21. With this configuration, the single vehicle wheel 1 includes the two tire portions 4*a*, 4*b*. This allows the vehicle wheel 1 to support a larger load compared with a vehicle wheel 1 with only one tire portion.

In the above embodiment, a case in which the vehicle wheel 1 includes two tire portions 4*a*, 4*b* has been described. The number of tire portions included in the vehicle wheel 1 is, however, not limited to two. The vehicle wheel 1 may include three or more tire portions.

Figure 12:
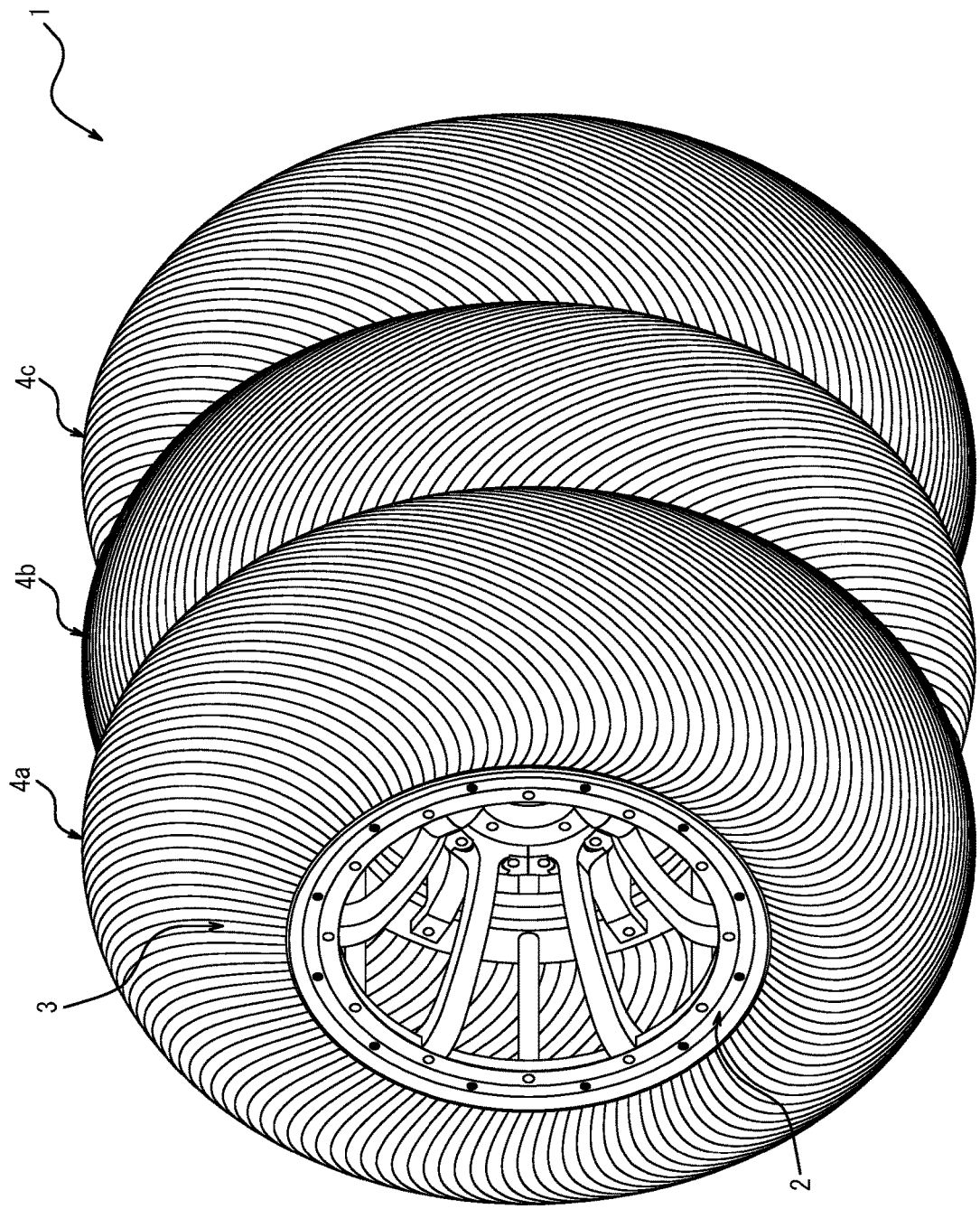
FIG. 12 is an external perspective view illustrating a vehicle wheel with three tire portions.

FIG. 12 is an external perspective view illustrating a vehicle wheel 1 with three tire portions 4*a*, 4*b*, 4*c*. As illustrated in FIG. 12, the vehicle wheel 1 may include three tire portions 4*a*, 4*b*, 4*c*. In this case, the skeleton portion 2 of the vehicle wheel 1 includes two rim members 11*a*, 11*b* and two flange members 12. The two flange members 12 are disposed so as to have the same rotation axis as the two rim members 11*a*, 11*b*, and they are disposed between the two rim members 11*a*, 11*b*. Body springs 21 are configured so as to connect adjacent members among the two rim members 11*a*, 11*b* and the two flange members 12, so that three tire portions 4*a*, 4*b*, 4*c* are formed. Specifically, the tire portion 4*a* is formed by attaching body springs 21 to one rim member and one flange member adjacent to it. The tire portion 4*c* is formed by attaching body springs 21 to the other rim member and the other flange member adjacent to it. The tire portion 4*b* is formed by attaching body springs 21 between the two adjacent flange members. Thus, the vehicle wheel 1 of FIG. 12 differs from the vehicle wheel 1 described in the above embodiment in that it includes the two flange members and that the body springs 21 are attached between the adjacent flange members. Other aspects are similar to those of the vehicle wheel 1 described in the above embodiment. According to the vehicle wheel 1 with the three tire portions 4a, 4b, 4c, load bearing capacity is further increased.

Figure 13:
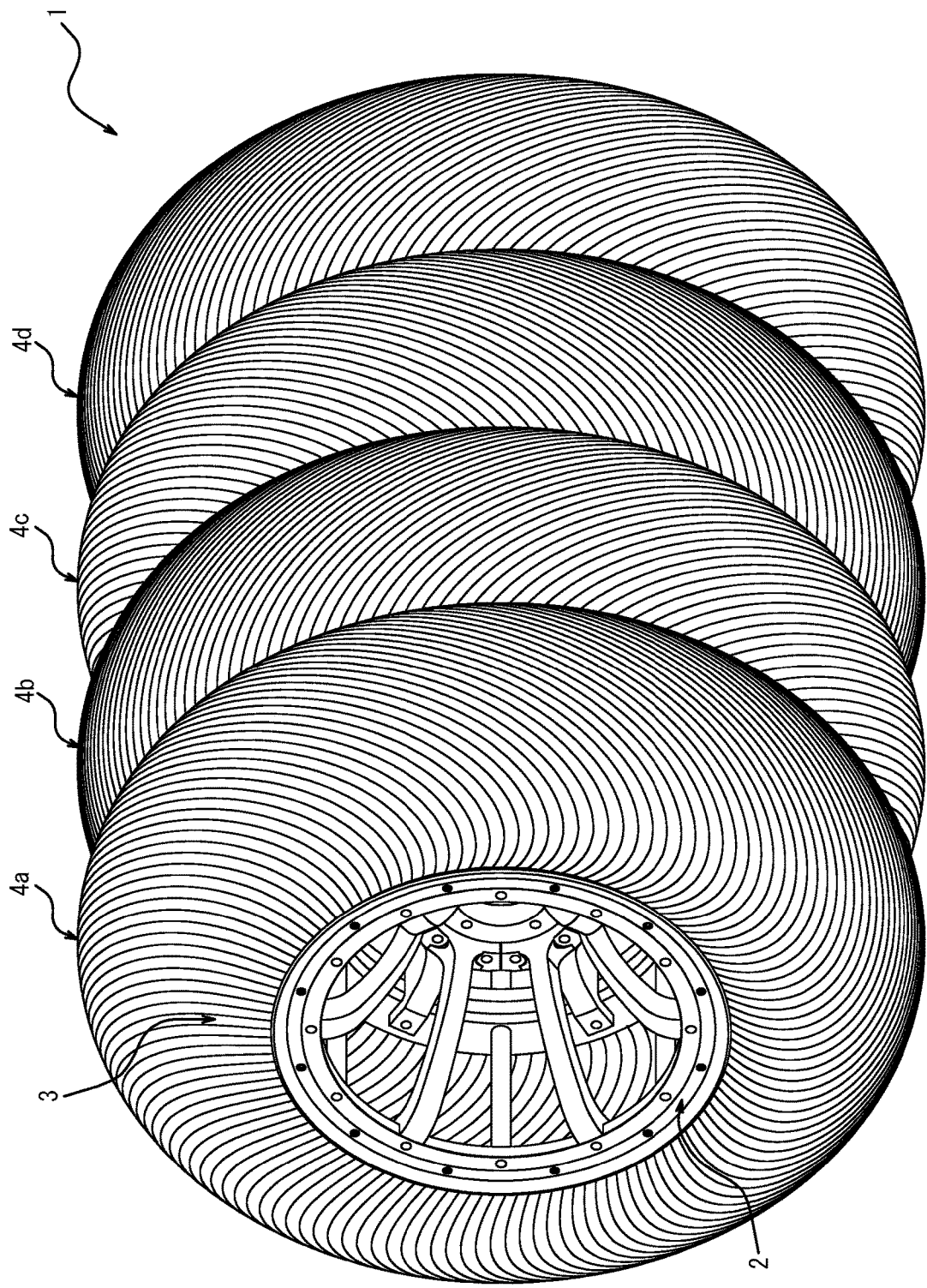
FIG. 13 is an external perspective view illustrating a vehicle wheel with four tire portions.

FIG. 13 is an external perspective view illustrating a vehicle wheel 1 with four tire portions 4a, 4b, 4c, 4d. As illustrated in FIG. 13, the vehicle wheel 1 may include four tire portions 4a, 4b, 4c, 4d. In this case, the skeleton portion 2 of the vehicle wheel 1 includes two rim members 11a, 11b and three flange members 12. The three flange members 12 are disposed so as to have the same rotation axis as the two rim members 11a, 11b, and they are disposed between the two rim members 11a, 11b. In this case, as is the case with the vehicle wheel 1 of FIG. 12, body springs 21 are attached between the flange members. In a case in which the vehicle wheel 1 includes four tire portions 4a, 4b, 4c, 4d, the tire portions 4b, 4c are formed by attaching body springs 21 between the flange members. According to the vehicle wheel 1 with the four tire portions 4a, 4b, 4c, 4d, load bearing capacity is further increased.

As illustrated in FIG. 12 and FIG. 13, in vehicle wheels with three or more tire portions, as is case with the vehicle wheel 1 described in the above embodiment, treads with different patterns may be formed in different tire portions. This provides a greater degree of freedom for surface patterns in vehicle wheels 1.

Although the present disclosure has been described based on the drawings and examples, it is to be noted that various modifications and revisions may be implemented by those skilled in the art based on the present disclosure. Such modifications and revisions are included within the scope of the present disclosure. For example, functions or the like included in each component or the like can be rearranged without logical inconsistency, and a plurality of components can be combined together or divided.

REFERENCE SIGNS LIST

1 Vehicle wheel
10 Wheel portion
11a, 11b Rim member
12 Flange member
12a First member
12b Second member
13 Securing member
14a, 14b Spoke member
15 Spoke
16 Sub-spoke
17a First bolt hole
17b Second bolt hole
18 Counter bore
19 Surface
2 Skeleton portion
20, 25 Groove
21 Body spring
22 Elastic deformable portion
23 Locking portion
23a Straight portion
23b Bent portion
24 Linking spring
3 Tread portion
30 Tread member
30a Through hole
31 Core material
32 Non-woven fabric
33 Reinforcement member
4a, 4b, 4c, 4d Tire portion
A Axis of body spring

The invention claimed is:

1. A vehicle wheel comprising:
two annular rim members disposed on a same axis;
at least one annular flange member disposed between the two rim members so as to have a same rotation axis as the two rim members;
a securing member that secures a positional relationship between adjacent members among the two rim members and the at least one flange member;
a plurality of body springs that each connect adjacent members among the two rim members and the at least one flange member; and
a plurality of linking springs that are linked to the plurality of body springs so as to restrict relative displacement between the plurality of body springs, wherein
at least part of each body spring in the plurality of body springs in a width direction of the vehicle wheel protrudes further to an outer side in a radial direction of the vehicle wheel than the rim members and the flange member, and the plurality of body springs are provided at intervals over an entire circumferential direction of the vehicle wheel, and
the plurality of body springs are attached to the rim members and the flange member so that an axis of each body spring in the plurality of body springs forms an inclination angle of less than 30 degrees with respect to the radial direction of the vehicle wheel at peripheral portions of the rim members and the flange member.

2. The vehicle wheel according to claim 1, further comprising
spoke members that are fitted to the two respective rim members.

3. The vehicle wheel according to claim 1, wherein the flange member is formed by securing two members with a same shape to each other.

4. The vehicle wheel according to claim 1, further comprising
a plurality of tire portions that each include a skeleton portion and a tread portion fitted to an outer side in the radial direction of the skeleton portion, wherein, in the skeleton portion, a deformable ground contacting portion is formed by the plurality of body springs, and wherein
the tread portion is configured with tread members, and in each tire portion in the plurality of tire portions, tread members are arranged in one direction.

5. The vehicle wheel according to claim 4, wherein the direction in which the tread members are arranged with respect to a rotation axis of the plurality of tire portions in one tire portion in the plurality of tire portions is different from the direction in which the tread members are arranged with respect to the rotation axis of the plurality of tire portions in another tire portion in the plurality of tire portions.

6. The vehicle wheel according to claim 2, wherein the flange member is formed by securing two members with a same shape to each other.

7. The vehicle wheel according to claim 2, further comprising
a plurality of tire portions that each include a skeleton portion and a tread portion fitted to an outer side in the radial direction of the skeleton portion, wherein, in the skeleton portion, a deformable ground contacting portion is formed by the plurality of body springs, and wherein the tread portion is configured with tread members, and in each tire portion in the plurality of tire portions, tread members are arranged in one direction.

8. The vehicle wheel according to claim 3, further comprising a plurality of tire portions that each include a skeleton portion and a tread portion fitted to an outer side in the radial direction of the skeleton portion, wherein, in the skeleton portion, a deformable ground contacting portion is formed by the plurality of body springs, and wherein the tread portion is configured with tread members, and in each tire portion in the plurality of tire portions, tread members are arranged in one direction.

9. A vehicle wheel comprising:

two annular rim members disposed on a same axis;

at least one annular flange member disposed between the two rim members so as to have a same rotation axis as the two rim members;

a securing member that secures a positional relationship between adjacent members among the two rim members and the at least one flange member;

a plurality of body springs that each connect adjacent members among the two rim members and the at least one flange member; and a plurality of linking springs that are linked to the plurality of body springs so as to restrict relative displacement between the plurality of body springs, wherein at least part of each body spring in the plurality of body springs in a width direction of the vehicle wheel protrudes further to an outer side in a radial direction of the vehicle wheel than the rim members and the flange member, and the plurality of body springs are provided at intervals over an entire circumferential direction of the vehicle wheel, and the flange member is formed by securing two members with a same shape to each other.

10. The vehicle wheel according to claim 9, further comprising spoke members that are fitted to the two respective rim members.

11. The vehicle wheel according to claim 9, further comprising a plurality of tire portions that each include a skeleton portion and a tread portion fitted to an outer side in the radial direction of the skeleton portion, wherein, in the skeleton portion, a deformable ground contacting portion is formed by the plurality of body springs, and wherein the tread portion is configured with tread members, and in each tire portion in the plurality of tire portions, tread members are arranged in one direction.

* * * * *